US012690077B2

(12) United States Patent
Wang et al.

(10) Patent No.: US 12,690,077 B2
(45) Date of Patent: *Jul. 21, 2026

(54) METHODS FOR CONCURRENT LINK SETUP AND DOWNLINK DATA RETRIEVAL FOR HIGH EFFICIENCY WLAN

(71) Applicant: InterDigital Patent Holdings, Inc., Wilmington, DE (US)

(72) Inventors: Xiaofei Wang, North Caldwell, NJ (US); Hanqing Lou, Syosset, NY (US); Guodong Zhang, Woodbury, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/763,205

(22) Filed: Jul. 3, 2024

(65) Prior Publication Data

US 2024/0365393 A1 Oct. 31, 2024

Related U.S. Application Data

(63) Continuation of application No. 18/323,071, filed on May 24, 2023, now Pat. No. 12,069,738, which is a
(Continued)

(51) Int. Cl.
H04W 76/10 (2018.01)
H04W 48/16 (2009.01)
(Continued)

(52) U.S. Cl.
CPC ........... H04W 76/10 (2018.02); H04W 48/16 (2013.01); H04W 48/18 (2013.01); H04W 84/12 (2013.01)

(58) Field of Classification Search
CPC . H04W 48/16; H04W 48/18; H04W 74/0833; H04W 76/10; H04W 84/12
See application file for complete search history.

(56) References Cited

U.S. PATENT DOCUMENTS 8,351,469 B2 1/2013 Shimomura et al.
9,288,021 B2 3/2016 Zhang et al.
(Continued)

FOREIGN PATENT DOCUMENTS

CN 103313367 9/2013
CN 104853385 8/2015
(Continued)

OTHER PUBLICATIONS

Aboul-Magd, "TGax Jul. 2015 Meeting Agenda," IEEE 802.11-15/0735r5 (Jun. 4, 2015).
(Continued)

*Primary Examiner* — Rina C Pancholi
(74) *Attorney, Agent, or Firm* — Volpe Koenig

(57) ABSTRACT

Systems, methods, and instrumentalities are disclosed for concurrent link setup and downlink data retrieval, e.g., for high efficiency WLAN. An access point (AP) may send a trigger element that allocates a resource for pre-association transmissions with the AP. The trigger element may allocate the resource for random access and/or deterministic access. The AP may receive, from an unassociated STA, a first frame via one or more resource units (RUs) allocated in the trigger element. The AP may determine a pre-association identifier (PID) that identifies the unassociated STA. The AP may send the PID to the unassociated STA, for example, in the trigger element or in the multi-STA ACK. The AP may send a second frame associated with a multi-user (MU) transmission that includes the PID. The AP may send a trigger frame that includes the PID.

15 Claims, 17 Drawing Sheets

1200

Related U.S. Application Data continuation of application No. 17/509,915, filed on Oct. 25, 2021, now Pat. No. 11,678,382, which is a continuation of application No. 15/770,080, filed as application No. PCT/US2016/058146 on Oct. 21, 2016, now Pat. No. 11,160,112.

(60) Provisional application No. 62/245,621, filed on Oct. 23, 2015.

(51) Int. Cl.
| | |
|---|---|
| *H04W 48/18* | (2009.01) |
| *H04W 84/12* | (2009.01) |

(56) References Cited

U.S. PATENT DOCUMENTS

| | | | |
|---|---|---|---|
| 9,313,741 | B2 | 4/2016 | Park et al. |
| 9,319,902 | B2 | 4/2016 | Kim et al. |
| 9,374,190 | B2 | 6/2016 | Koskela et al. |
| 9,408,230 | B2 | 8/2016 | Zou et al. |
| 9,451,636 | B2 | 9/2016 | Seok |
| 9,661,526 | B2 | 5/2017 | Kim et al. |
| 9,729,367 | B2 | 8/2017 | Sohn et al. |
| 9,736,871 | B2 | 8/2017 | Kim et al. |
| 9,900,865 | B2 | 2/2018 | Seok |
| 10,051,659 | B2 | 8/2018 | Zhang et al. |
| 10,616,933 | B2 | 4/2020 | Wang et al. |
| 2008/0205207 | A1 | 8/2008 | Den Hollander et al. |
| 2013/0176897 | A1 | 7/2013 | Wang et al. |
| 2013/0230036 | A1 | 9/2013 | Reznik et al. |
| 2014/0098724 | A1 | 4/2014 | Park et al. |
| 2014/0169247 | A1* | 6/2014 | Jafarian ............ H04W 52/0212 |
| | | | 370/311 |
| 2014/0169291 | A1 | 6/2014 | Jafarian et al. |
| 2014/0211678 | A1* | 7/2014 | Jafarian ................ H04W 68/02 |
| | | | 370/311 |
| 2014/0254502 | A1* | 9/2014 | Cai ....................... H04W 48/20 |
| | | | 370/329 |
| 2014/0269532 | A1 | 9/2014 | Huang et al. |
| 2014/0286321 | A1 | 9/2014 | Balian et al. |
| 2015/0131640 | A1 | 5/2015 | Seok et al. |
| 2016/0143006 | A1* | 5/2016 | Ghosh ................. H04W 74/004 |
| | | | 370/329 |
| 2016/0219510 | A1* | 7/2016 | Asterjadhi ........ H04W 52/0274 |
| 2016/0219522 | A1* | 7/2016 | Asterjadhi ........ H04W 52/0235 |
| 2016/0262090 | A1* | 9/2016 | Marin ................... H04W 48/16 |
| 2017/0273140 | A1* | 9/2017 | Ryu ...................... H04W 88/10 |
| 2018/0077735 | A1* | 3/2018 | Ahn .................... H04L 27/2602 |
| 2018/0324685 | A1 | 11/2018 | Patil et al. |

FOREIGN PATENT DOCUMENTS

| | | |
|---|---|---|
| WO | 2012/026932 | 3/2012 |
| WO | 2013/162279 | 10/2013 |

OTHER PUBLICATIONS

Asterjadhi et al., "Scheduled Trigger Frames", Qualcomm, IEEE 802.11-15/0880r2, Jul. 4, 2015, 17 pages.

Asterjadhi et al., "Scheduled Trigger Frames", Qualcomm, IEEE 802.11-15/0880r0, Jul. 4, 2015, 17 pages.

Asterjadhi et al., "HE A-Control Field", Qualcomm, IEEE 802.11-15/1121r0, Sep. 12, 2015, 18 pages.

Bellalta et al., "IEEE 802.11ax: High-Efficiency WLANs", IEEE Wireless Communications Magazine, Jul. 28, 2015, 16 pages.

Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for High Efficiency WLAN, IEEE P802.11ax/D0.5 (Sep. 2016).

Ghosh et al., "Random Access with Trigger Frames using OFDMA", Intel, IEEE 802.11-15/0875r1, Jul. 13, 2015, 16 pages.

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE, "Part 11: Wireless LAN Medium Access Control (MAC) and Physical Layer (PHY) Specifications—Amendment 5: TV White Spaces Operation", IEEE P802.11af/02.0, Jul. 2012, 326 pages.

IEEE, "Part 11: Wireless LAN Medium Access Control (MAC) and Physical Layer (PHY) Specifications", IEEE Std 802.11™-2012, Mar. 29, 2012, 2793 pages.

IEEE, "Part 11: Wireless LAN Medium Access Control (MAC) and Physical Layer (PHY) Specifications—Amendment 5: Enhancements for Very High Throughput for Operation in Bands below 6 GHz", IEEE P802.11ac/01.0, May 2011, 263 pages.

IEEE, "Part 11: Wireless LAN Medium Access Control (MAC) and Physical Layer (PHY) Specifications—Amendment 2: Sub 1 GHz License Exempt Operation", P802.11ah/05.0, Mar. 2015.

IEEE, "Part 11: Wireless LAN Medium Access Control (MAC) and Physical Layer (PHY) Specifications—Amendment 3: Enhancements for Very High Throughput in the 60 GHz Band", IEEE Std 802.11ad™-2012, Dec. 28, 2012, 628 pages.

Magd, Aboul Osama, "802.11 HEW SG Proposed PAR", Huawei Technologies, IEEE 802.11-14/165r1, IEEE P802.11 Wireless LANs, Mar. 17, 2014, 6 pages.

Magd, Aboul Osama, "IEEE 802.11 Hew SG Proposed CSO", Huawei Technologies, IEEE 802.11-14/169r1, Mar. 18, 2014, 6 pages.

Merlin et al., "Trigger Frame Format", Qualcomm, IEEE 802.11-15/0877r1, Jul. 13, 2015, 15 pages.

Stacey, "Specification Framework for TGax", Intel, IEEE 802.11-15/0132r7, IEEE P802.11 Wireless LANs, Jul. 20, 2015, 13 pages.

Stacey, "Specification Framework for TGax", Intel, IEEE 802.11-15/0132r9, I15EEE P802.11 Wireless LANs, Sep. 22, 2015, 22 pages.

* cited by examiner

500

| FC | DURATION | (A1) | A2 | COMMON INFO | PER USER INFO 1 | | PER USER INFO N | FCS |
|----|----------|------|-----|-------------|-----------------|---|-----------------|-----|
| 2  | 2        | TBD  | 6   | TBD         | TBD             |   | TBD             | 4   |

| OFFSET | TYPE | DURATION | STA IDS | RESOURCES BITMAPS | TX/RX SETTINGS |
|--------|------|----------|---------|-------------------|----------------|

FIG. 11

METHODS FOR CONCURRENT LINK SETUP AND DOWNLINK DATA RETRIEVAL FOR HIGH EFFICIENCY WLAN

CROSS REFERENCE TO RELATED APPLICATIONS

This application is a continuation of U.S. patent application Ser. No. 18/323,071 filed May 24, 2023 which claims priority to U.S. patent application Ser. No. 17/509,915 which was filed on Oct. 25, 2021 now U.S. Pat. No. 11,678,382 issued on Jun. 13, 2023, which is a continuation of U.S. patent application Ser. No. 15/770,080 which was filed on Apr. 20, 2018, which issued as U.S. Pat. No. 11,160,112 on Oct. 26, 2021, which is a National Stage Entry under 35 U.S.C. § 371 Patent Cooperation Treaty Application No. PCT/US2016/058146, filed Oct. 21, 2016, which claims the benefit of U.S. Provisional Application No. 62/245,621 filed Oct. 23, 2015, the entire contents of which are hereby incorporated by reference herein.

BACKGROUND

A Wireless Local Area Network (WLAN) may have multiple modes of operation, such as an Infrastructure Basic Service Set (BSS) mode and an Independent BSS (IBSS) mode. A WLAN in Infrastructure BSS mode may have an Access Point (AP) for the BSS. One or more wireless transmit receive units (WTRUs), e.g., stations (STAs), may be associated with an AP. An AP may have access or an interface to a Distribution System (DS) or other type of wired/wireless network that carries traffic in and out of a BSS. Traffic to STAs that originates from outside a BSS may arrive through an AP, which may deliver the traffic to the STAs. In certain WLAN systems STA to STA communication may take place. In certain WLAN systems an AP may act in the role of a STA. Beamforming may be used by WLAN devices. Current beamforming techniques may be limited.

SUMMARY

Systems, methods, and instrumentalities are disclosed for concurrent link setup and downlink data retrieval, e.g., for high efficiency WLAN. An access point (AP) may send a trigger element. The trigger element may allocate a resource for pre-association transmissions with the AP. One or more unassociated stations (STAs) may receive the trigger element. The trigger element may allocate the resource for random access and/or deterministic access. The trigger element may be sent in a first transmission opportunity (TXOP). The AP may receive, from an unassociated STA of the one or more unassociated STAs, a first frame via one or more resource units (RUS) allocated in the trigger element. The first frame may be an authentication request frame. The first frame may be received in the first TXOP. The AP may send an acknowledgement (ACK) in response to receipt of the first frame. The ACK may be a multi-STA ACK. The AP may determine a pre-association identifier (PID) that identifies the unassociated STA. The PID may be determined by the unassociated STA, e.g., separately, and/or the AP may assign the PID to the unassociated STA. The PID may be determined using a portion of an association identifier (AID). The AP may send the PID to the unassociated STA, for example, in the trigger element or in the multi-STA ACK, e.g., when assigning the PID to the unassociated STA.

The AP may send a second frame associated with a multi-user (MU) transmission. The second frame may be part of a downlink (DL) MU physical layer convergence procedure (PLCP) protocol data unit (PPDU). The second frame may be an authentication response frame and may include the PID. The second frame may include the PID in a signal (SIG) field. For example, the PID may be included in a preamble (e.g., a SIG field of the preamble) of the DL MU PPDU. The second frame may be sent in a second TXOP that follows the first TXOP. The AP may send a trigger frame that includes the PID. The trigger frame may be sent before the unassociated STA associates with the AP. The AP may receive, from the unassociated STA, an association request frame, e.g., in response to the trigger frame. The AP may send an association response frame, in response to the association request frame, that indicates an AID for the unassociated STA. The AP may determine to use the PID as the AID.

BRIEF DESCRIPTION OF THE DRAWINGS

FIG. 5 is a diagram depicting an example trigger frame format.

FIG. 11 is a diagram depicting an example trigger field design for random access.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
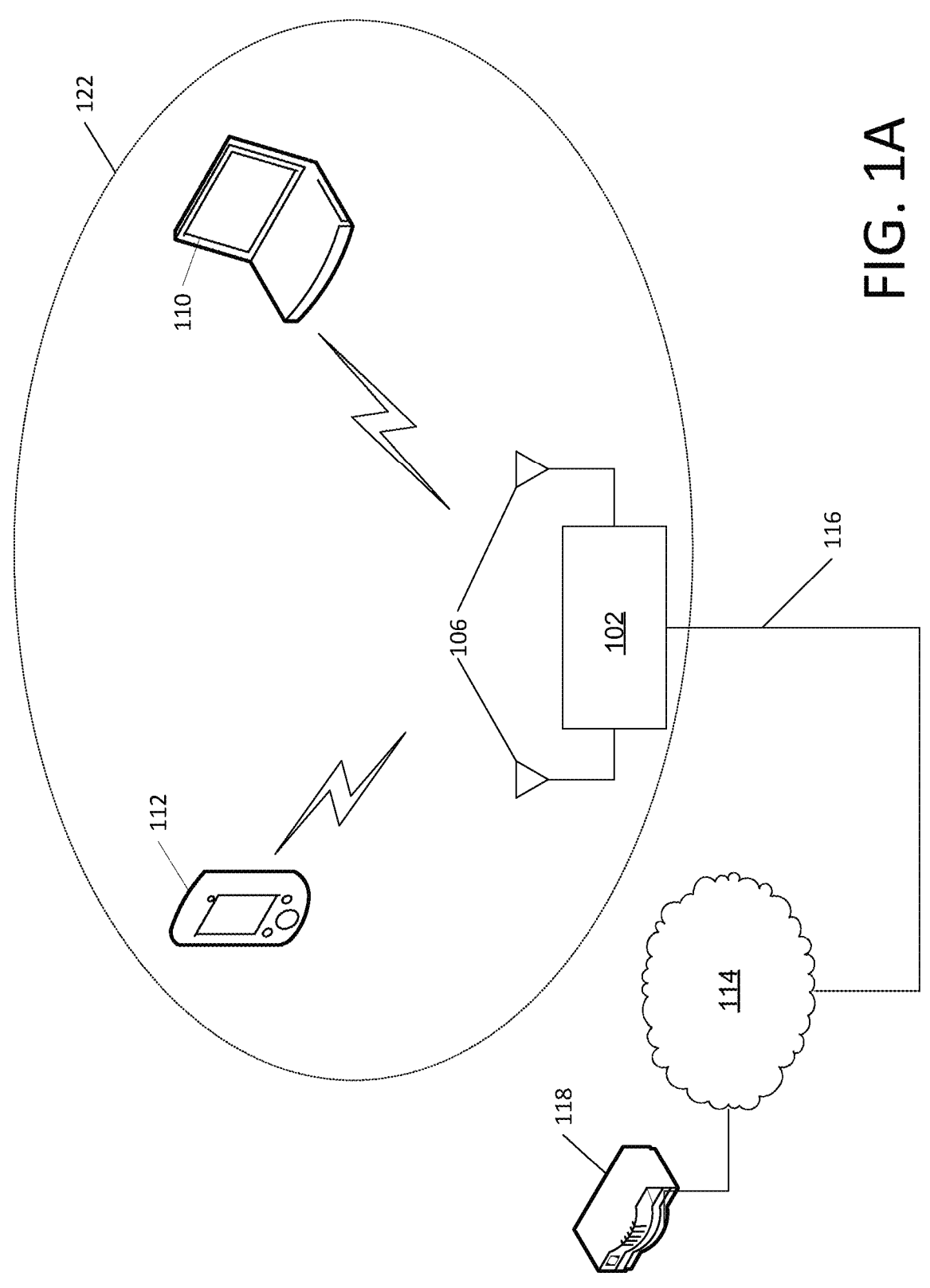
FIG. 1A illustrates exemplary wireless local area network (WLAN) devices.

FIG. 1A illustrates exemplary wireless local area network (WLAN) devices. One or more of the devices may be used to implement one or more of the features described herein. The WLAN may include, but is not limited to, access point (AP) 102, station (STA) 110, and STA 112. STA 110 and 112 may be associated with AP 102. The WLAN may be configured to implement one or more protocols of the IEEE 802.11 communication standard, which may include a channel access scheme, such as DSSS, OFDM, OFDMA, etc. A WLAN may operate in a mode, e.g., an infrastructure mode, an ad-hoc mode, etc.

A WLAN operating in an infrastructure mode may comprise one or more APs communicating with one or more associated STAs. An AP and STA(s) associated with the AP may comprise a basic service set (BSS). For example, AP 102, STA 110, and STA 112 may comprise BSS 122. An extended service set (ESS) may comprise one or more APs (with one or more BSSs) and STA(s) associated with the APs. An AP may have access to, and/or interface to, distribution system (DS) 116, which may be wired and/or wireless and may carry traffic to and/or from the AP. Traffic to a STA in the WLAN originating from outside the WLAN may be received at an AP in the WLAN, which may send the traffic to the STA in the WLAN. Traffic originating from a STA in the WLAN to a destination outside the WLAN, e.g., to server 118, may be sent to an AP in the WLAN, which may send the traffic to the destination, e.g., via DS 116 to network 114 to be sent to server 118. Traffic between STAs within the WLAN may be sent through one or more APs. For example, a source STA (e.g., STA 110) may have traffic intended for a destination STA (e.g., STA 112). STA 110 may send the traffic to AP 102, and, AP 102 may send the traffic to STA 112.

A WLAN may operate in an ad-hoc mode. The ad-hoc mode WLAN may be referred to as independent basic service set (IBBS). In an ad-hoc mode WLAN, the STAs may communicate directly with each other (e.g., STA 110 may communicate with STA 112 without such communication being routed through an AP).

IEEE 802.11 devices (e.g., IEEE 802.11 APs in a BSS) may use beacon frames to announce the existence of a WLAN network. An AP, such as AP 102, may transmit a beacon on a channel, e.g., a fixed channel, such as a primary channel. A STA may use a channel, such as the primary channel, to establish a connection with an AP.

STA(s) and/or AP(s) may use a Carrier Sense Multiple Access with Collision Avoidance (CSMA/CA) channel access mechanism. In CSMA/CA a STA and/or an AP may sense the primary channel. For example, if a STA has data to send, the STA may sense the primary channel. If the primary channel is detected to be busy, the STA may back off. For example, a WLAN or portion thereof may be configured so that one STA may transmit at a given time, e.g., in a given BSS. Channel access may include RTS and/or CTS signaling. For example, an exchange of a request to send (RTS) frame may be transmitted by a sending device and a clear to send (CTS) frame that may be sent by a receiving device. For example, if an AP has data to send to a STA, the AP may send an RTS frame to the STA. If the STA is ready to receive data, the STA may respond with a CTS frame. The CTS frame may include a time value that may alert other STAs to hold off from accessing the medium while the AP initiating the RTS may transmit its data. On receiving the CTS frame from the STA, the AP may send the data to the STA.

A device may reserve spectrum via a network allocation vector (NAV) field. For example, in an IEEE 802.11 frame, the NAV field may be used to reserve a channel for a time period. A STA that wants to transmit data may set the NAV to the time for which it may expect to use the channel. When a STA sets the NAV, the NAV may be set for an associated WLAN or subset thereof (e.g., a BSS). Other STAs may count down the NAV to zero. When the counter reaches a value of zero, the NAV functionality may indicate to the other STA that the channel is now available.

The devices in a WLAN, such as an AP or STA, may include one or more of the following: a processor, a memory, a radio receiver and/or transmitter (e.g., which may be combined in a transceiver), one or more antennas (e.g., antennas 106 in FIG. 1A), etc. A processor function may comprise one or more processors. For example, the processor may comprise one or more of: a general purpose processor, a special purpose processor (e.g., a baseband processor, a MAC processor, etc.), a digital signal processor (DSP), Application Specific Integrated Circuits (ASICs), Field Programmable Gate Array (FPGAs) circuits, any other type of integrated circuit (IC), a state machine, and the like. The one or more processors may be integrated or not integrated with each other. The processor (e.g., the one or more processors or a subset thereof) may be integrated with one or more other functions (e.g., other functions such as memory). The processor may perform signal coding, data processing, power control, input/output processing, modulation, demodulation, and/or any other functionality that may enable the device to operate in a wireless environment, such as the WLAN of FIG. 1A. The processor may be configured to execute processor executable code (e.g., instructions) including, for example, software and/or firmware instructions. For example, the processer may be configured to execute computer readable instructions included on one or more of the processor (e.g., a chipset that includes memory and a processor) or memory. Execution of the instructions may cause the device to perform one or more of the functions described herein.

A device may include one or more antennas. The device may employ multiple input multiple output (MIMO) techniques. The one or more antennas may receive a radio signal. The processor may receive the radio signal, e.g., via the one or more antennas. The one or more antennas may transmit a radio signal (e.g., based on a signal sent from the processor).

The device may have a memory that may include one or more devices for storing programming and/or data, such as processor executable code or instructions (e.g., software, firmware, etc.), electronic data, databases, or other digital information. The memory may include one or more memory units. One or more memory units may be integrated with one or more other functions (e.g., other functions included in the device, such as the processor). The memory may include a read-only memory (ROM) (e.g., erasable programmable read only memory (EPROM), electrically erasable programmable read only memory (EEPROM), etc.), random access memory (RAM), magnetic disk storage media, optical storage media, flash memory devices, and/or other non-transitory computer-readable media for storing information. The memory may be coupled to the processer. The processer may communicate with one or more entities of memory, e.g., via a system bus, directly, etc.

Figure 1B:
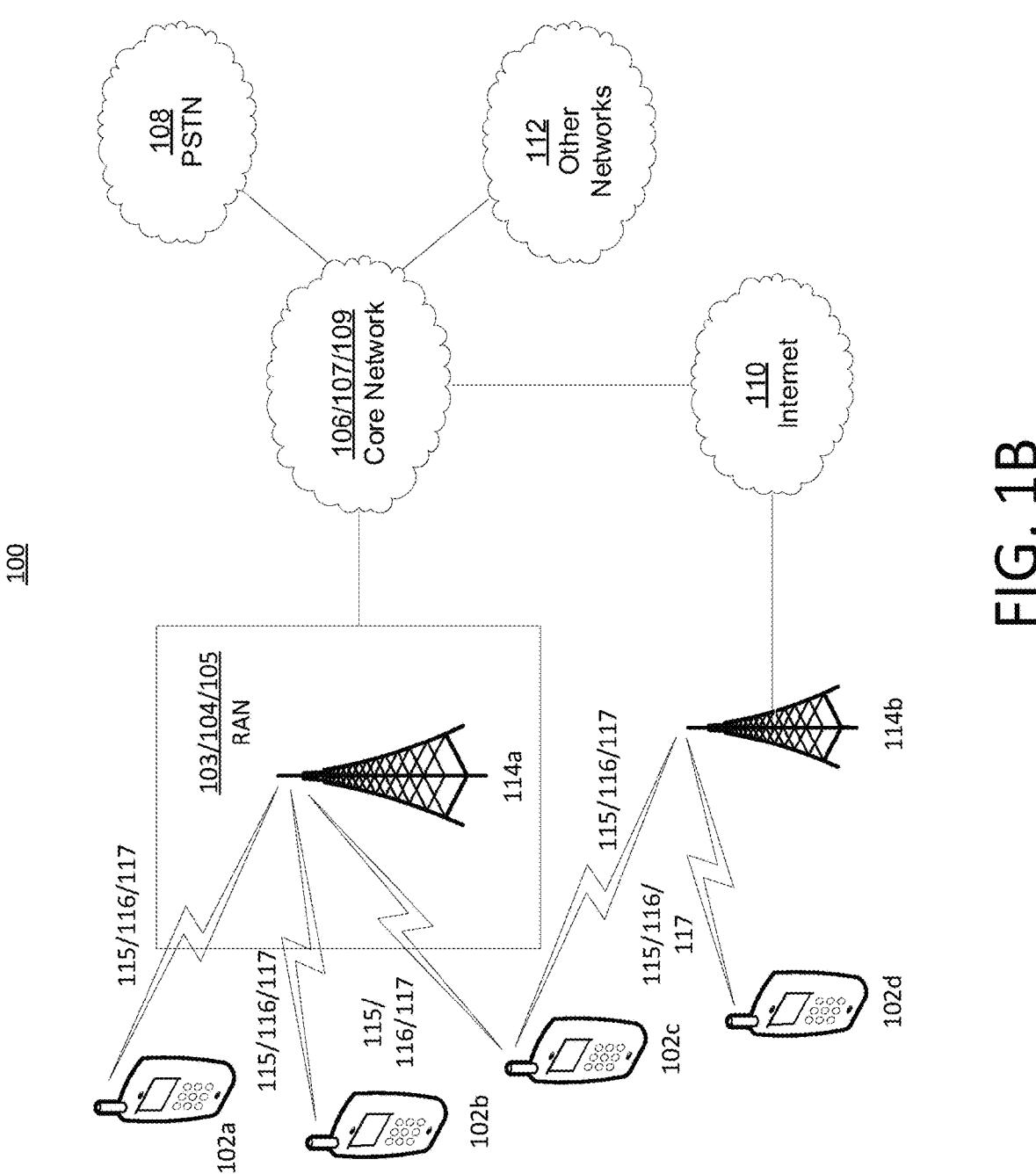
FIG. 1B is a diagram of an example communications system in which one or more disclosed features may be implemented.

FIG. 1B is a diagram of an example communications system 100 in which one or more disclosed features may be implemented. For example, a wireless network (e.g., a wireless network comprising one or more components of the communications system 100) may be configured such that bearers that extend beyond the wireless network (e.g., beyond a walled garden associated with the wireless network) may be assigned QoS characteristics.

The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1B, the communications system 100 may include at least one wireless transmit/receive unit (WTRU), such as a plurality of WTRUs, for instance WTRUs 102a, 102b, 102c, and 102d, a radio access network (RAN) 104, a core network 106, a public switched telephone network (PSTN) 108, the Internet 110, and other networks 112, though it should be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station (e.g., a WLAN STA), a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it should be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infra-red (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1B may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1B, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1B, it should be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102*a*, 102*b*, 102*c*, 102*d* in the communications system 100 may include multi-mode capabilities, i.e., the WTRUs 102*a*, 102*b*, 102*c*, 102*d* may include multiple transceivers for communicating with different wireless networks over different wireless links. For example, the WTRU 102*c* shown in FIG. 1B may be configured to communicate with the base station 114*a*, which may employ a cellular-based radio technology, and with the base station 114*b*, which may employ an IEEE 802 radio technology.

Figure 1C:
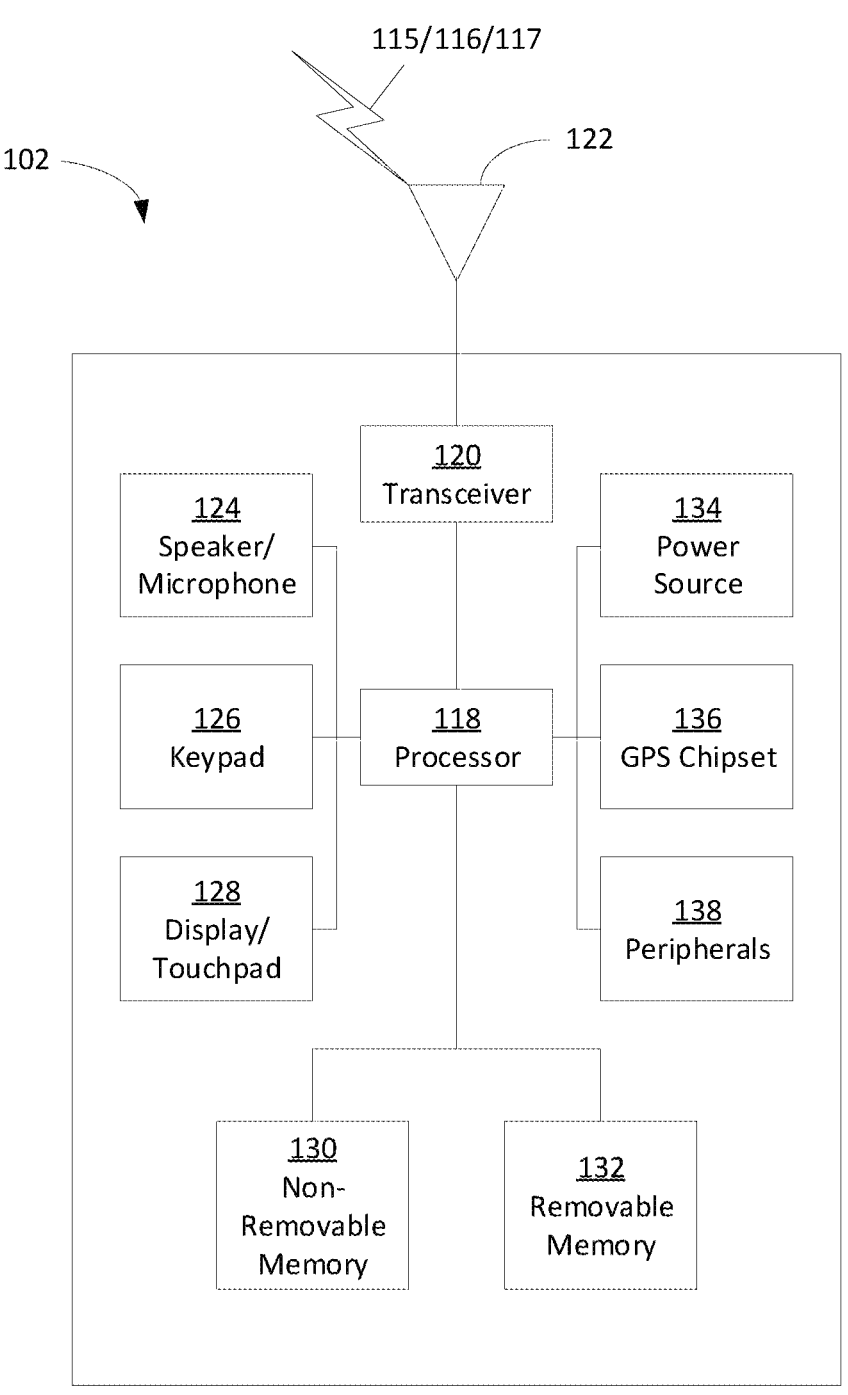
FIG. 1C depicts an exemplary wireless transmit/receive unit, WTRU.

FIG. 1C depicts an exemplary wireless transmit/receive unit, WTRU 102. A WTRU may be a user equipment (UE), a mobile station, a WLAN STA, a fixed or mobile subscriber unit, a pager, a cellular telephone, a personal digital assistant (PDA), a smartphone, a laptop, a netbook, a personal computer, a wireless sensor, consumer electronics, and the like. WTRU 102 may be used in one or more of the communications systems described herein. As shown in FIG. 1C, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It should be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1C depicts the processor 118 and the transceiver 120 as separate components, it should be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It should be appreciated that the transmit/receive element 122 may be configured to transmit and/or receive any combination of wireless signals.

In addition, although the transmit/receive element 122 is depicted in FIG. 1C as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It should be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like. A Wireless Local Area Network (WLAN) may have multiple modes of operation, such as an Infrastructure Basic Service Set (BSS) mode and an Independent BSS (IBSS) mode. A WLAN in Infrastructure BSS mode may have an Access Point (AP) for the BSS. One or more stations (STAs) may be associated with an AP. An AP may have access or an interface to a Distribution System (DS) or other type of wired/wireless network that carries traffic in and out of a BSS. Traffic to STAs that originates from outside a BSS may arrive through an AP, which may deliver the traffic to the STAs. Traffic originating from STAs to destinations outside a BSS may be sent to an AP, which may deliver the traffic to respective destinations. Traffic between STAs within a BSS may be sent through an AP, e.g., from a source STA to the AP and from the AP to the destination STA. Traffic between STAs within a BSS may be peer-to-peer traffic. Peer-to-peer traffic may be sent directly between the source and destination STAs, for example, with a direct link setup (DLS) using an 802.11e DLS or an 802.11z tunneled DLS (TDLS). A WLAN in Independent BSS (IBSS) mode may not have an AP, and, STAs may communicate directly with each other. An IBSS mode of communication may be referred to as an "ad-hoc" mode of communication.

An AP may transmit a beacon on a fixed channel (e.g. a primary channel), for example, in an 802.11ac infrastructure mode of operation. A channel may be, for example, 20 MHz wide. A channel may be an operating channel of a BSS. A channel may be used by STAs, for example, to establish a connection with an AP. A channel access mechanism in an 802.11 system is Carrier Sense Multiple Access with Collision Avoidance (CSMA/CA). An STA, including an AP, may sense a primary channel, for example, in a CSMA/CA mode of operation. An STA may back off, for example, when a channel is detected to be busy so that only one STA may transmit at a time in a given BSS.

High Throughput (HT) STAs may use, for example, a 40 MHz wide channel for communication, e.g., in 802.11n. A primary 20 MHz channel may be combined with an adjacent 20 MHz channel to form a 40 MHz wide contiguous channel.

Very High Throughput (VHT) STAs may support, for example, 20 MHz, 40 MHz, 80 MHz and 160 MHz wide channels, e.g., in 802.11ac. 40 MHz and 80 MHz channels may be formed, for example, by combining contiguous 20 MHz channels. A 160 MHz channel may be formed, for example, by combining eight contiguous 20 MHz channels or by combining two non-contiguous 80 MHz channels, which may be referred to as an 80+80 configuration. An 80+80 configuration may be passed through a segment parser that divides data into two streams, for example, after channel encoding. Inverse Fast Fourier Transform (IFFT) and time domain processing may be performed, for example, on each stream separately. Streams may be mapped onto two channels. Data may be transmitted on the two channels. A receiver may reverse a transmitter mechanism. A receiver may recombine data transmitted on multiple channels. Recombined data may be sent to Media Access Control (MAC).

Sub-GHz (e.g. MHz) modes of operation may be supported, for example, by 802.11af and 802.11ah. Channel operating bandwidths and carriers may be reduced, for example, relative bandwidths and carriers used in 802.11n and 802.11ac. 802.11af may support, for example, 5 MHz, 10 MHz and 20 MHz bandwidths in a TV White Space (TVWS) spectrum. 802.11ah may support, for example, 1 MHz, 2 MHz, 4 MHz, 8 MHz and 16 MHz bandwidths in non-TVWS spectrum. An example of a use case for 802.11ah may be support for Meter Type Control (MTC) devices in a macro coverage area. MTC devices may have limited capabilities (e.g. limited bandwidths) and may be designed to have a very long battery life.

WLAN systems (e.g. 802.11n, 802.11ac, 802.11af and 802.11ah systems) may support multiple channels and channel widths, such as a channel designated as a primary channel. A primary channel may, for example, have a bandwidth equal to the largest common operating bandwidth supported by STAs in a BSS. Bandwidth of a primary channel may be limited by an STA that supports the smallest bandwidth operating mode. In an example of 802.11ah, a primary channel may be 1 MHz wide, for example, when there are one or more STAs (e.g. MTC type devices) that support a 1 MHz mode while an AP and other STAs support a 2 MHz, 4 MHz, 8 MHz, 16 MHz or other channel bandwidth operating modes. Carrier sensing and NAV settings may depend on the status of a primary channel. As an example, all available frequency bands may be considered busy and remain idle despite being available, for example, when a primary channel has a busy status due to an STA that supports a 1 MHz operating mode transmitting to an AP on the primary channel.

Available frequency bands may vary between different regions. As an example, in the United States, available frequency bands used by 802.11ah may be 902 MHz to 928 MHz in the United States, 917.5 MHz to 923.5 MHz in Korea and 916.5 MHz to 927.5 MHz in Japan. Total bandwidth available may vary between different regions. As an example, the total bandwidth available for 802.11ah may be 6 MHz to 26 MHz depending on the country code.

IEEE 802.11™ High Efficiency WLAN (HEW), which may be referred to as HE, may enhance the quality of service (QOS) experienced by wireless users in many usage scenarios, such as high-density deployments of APs and STAs in 2.4 GHz and 5 GHz bands. HEW Radio Resource Management (RRM) technologies may support a variety of applications or usage scenarios, such as data delivery for stadium events, high user density scenarios such as train stations or enterprise/retail environments, video delivery and wireless services for medical applications. HEW may be implemented, for example, in IEEE 802.11ax.

Short packets, which may be generated by network applications, may be applicable in a variety of applications, such as virtual office, TPC acknowledge (ACK), Video streaming ACK, device/controller (e.g. mice, keyboards, game controls), access (e.g. probe request/response), network selection (e.g. probe requests, Access Network Query Protocol (ANQP) and network management (e.g. control frames).

MU features, such as uplink (UL) and downlink (DL) Orthogonal Frequency-Division Multiple Access (OFDMA) and UL and DL MU-MIMO, may be implemented in 802.11ax. OFDMA may exploit channel selectivity, for example, to improve or maximize frequency selective multiplexing gain in dense network conditions. A mechanism may be designed and defined for feedback, for example, to enable fast link adaptation, frequency selective scheduling and resource unit based feedback.

Carrier sense multiple access with collision avoidance (CSMA/CA) may be utilized (e.g., as a channel access scheme) in 802.11. In CSMA/CA, one (e.g., only one) STA may access the media at a time. CSMA/CA in 802.11 may not support multi-user (MU) concurrent random access.

A Trigger Frame may be provided (e.g., in 802.11ax). The Trigger Frame may be sent by an AP. The Trigger Frame may synchronize and/or schedule upcoming concurrent UL MU transmissions. An UL MU Physical Layer Convergence Protocol (PLCP) protocol data unit (PPDU) (e.g., MU-MIMO or OFDMA) may be sent as a response (e.g., an immediate response) to a Trigger Frame sent by an AP.

Support for random access may be initiated by a Trigger Frame using OFDMA. A trigger frame may allocate resources for random access. A Random Trigger Frame (TF-R) may be used for random access. The TF-R may indicate at least one allocation for a resource unit (RU) that may be simultaneously random accessed by more than one STA.

Figure 2:
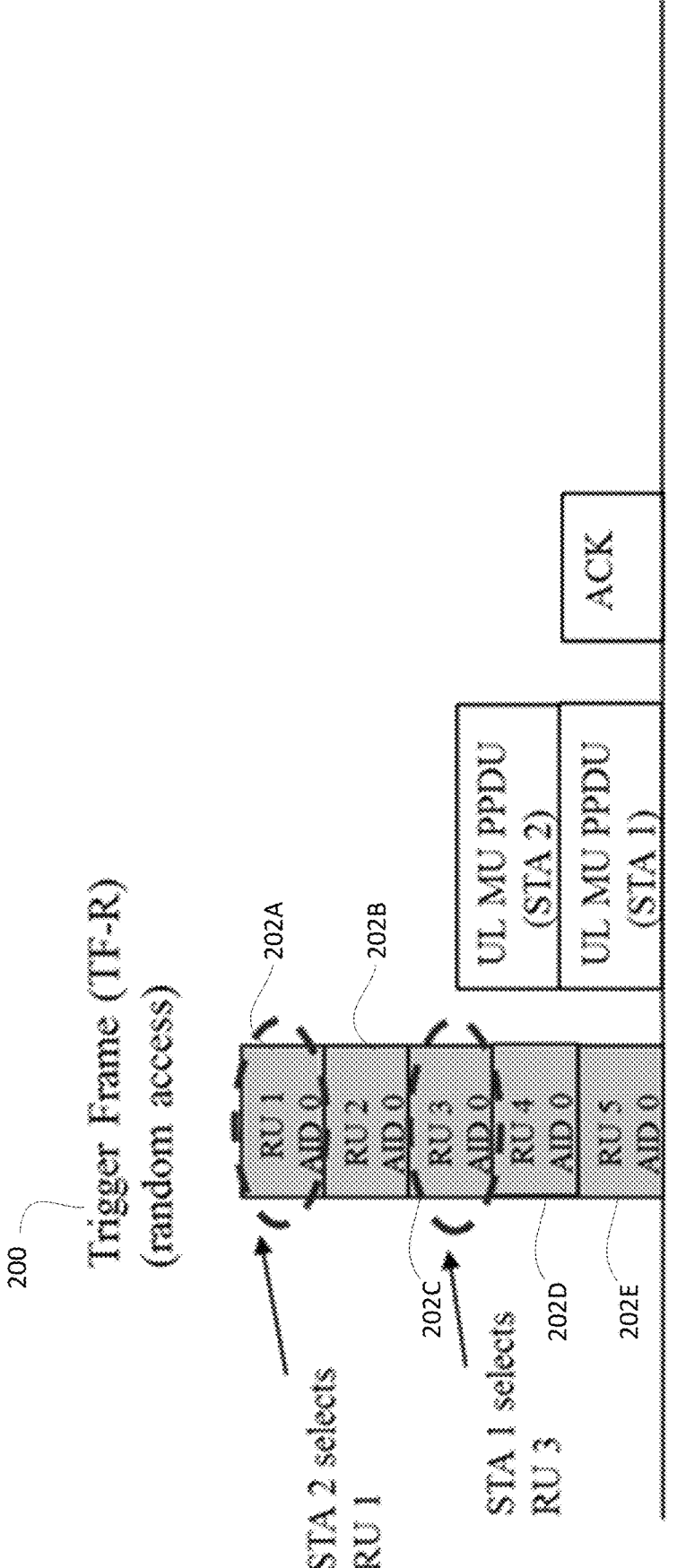
FIG. 2 is a diagram depicting an example Random Trigger Frame (TF-R).

FIG. 2 is a diagram depicting an example TF-R 200. For example, a TF-R 200 may include a plurality of RUs 202. As shown in FIG. 2, a first STA may select a first RU 202A of the plurality of RUs 202 and a second STA may select a second RU 202C of the plurality of RUs 202. A third RU 202B (e.g., RU 2), a fourth RU 202D (e.g., RU 4), and/or a fifth RU 202E (e.g., RU 5) may not be selected and/or assigned. The random access may be similar to slotted Aloha.

Mechanisms for a scheduled Trigger Frame may be provided. A scheduled Trigger Frame mechanism may include a solicited Trigger target wake time (TWT) and/or a broadcast Trigger TWT. The trigger frame mechanisms may include a target transmission time for a Trigger Frame to be indicated. The target transmission time for the Trigger Frame may be based on implicit TWT operation. The broadcast trigger TWT may be enabled by including a TWT element in a Beacon frame. For example, an AP may indicate one or more target trigger times in a TWT response in the Beacon frame. A TWT pattern may be valid (e.g., only valid) for a Beacon interval that follows the Beacon frame. The AP may indicate one or more broadcast trigger TWTs during a TWT setup. The solicited trigger TWT may be enabled by using an implicit TWT negotiation. For example, a STA may request that the AP schedule one or more Trigger Frames. The STA may request that the AP schedule one or more Trigger Frames via a TWT request. A TWT pattern may be determined based on a UL traffic pattern and/or Quality of Service (QOS) requirements. The TWT pattern may be periodic. The AP may respond to the request. The response may confirm the TWT request. The response may provide one or more alternative TWT schedules. The one or more alternative TWT schedules may be determined based on information from a plurality of STAs. Two or more STAs with similar traffic patterns may be allocated in similar TWTs (e.g., with similar TWT service periods and/or other similar parameters).

In a case where the broadcast trigger TWT is enabled, a STA and an AP may exchange a TWT request and a TWT response to indicate the target Beacon frame to be monitored by the PS STA.

Figure 3:
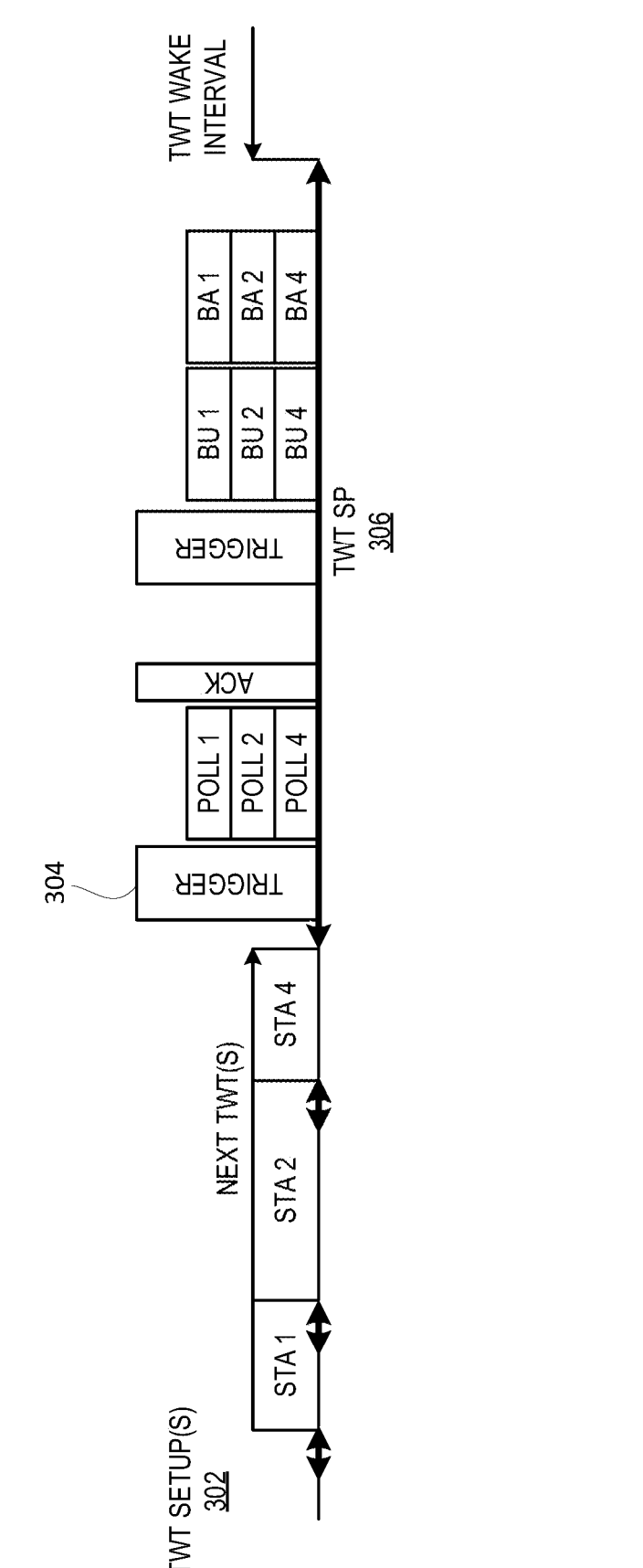
FIG. 3 is a diagram depicting an example Solicited Trigger Target Wake Time (TWT).

FIG. 3 is a diagram depicting an example Solicited Trigger TWT 300. The Solicited Trigger TWT 300 may include a Trigger TWT setup 302. Trigger TWT setup 302 may be negotiated. A high efficiency (HE) non-AP STA may request scheduling of a trigger frame. The HE non-AP STA may request scheduling of a trigger frame at the start of each TWT. An AP may confirm the scheduling of a trigger frame at the start of each TWT. The AP may schedule a trigger frame 304 at the start of each TWT service period (SP) 306. One or more non-AP STAs may wake up at the TWT. The one or more non-AP STAs may prepare for MU DL/UL exchange. The one or more non-AP STAs may wait for a trigger frame 304 sent by the AP. During the TWT SP 306, the one or more non-AP STAs may exchange power save (PS) Polls, automatic power save delivery (APSD) trigger frames, UL/DL bufferable units (BUs), and/or the like (e.g., upon reception of a trigger frame 304). A STA may not wake up to read the Beacon frame (e.g., when TWT has been negotiated). DL BU availability may be indicated during the TWT SP 306. The one or more non-AP STAs may renegotiate the TWT (e.g., when a traffic pattern changes).

Figure 4:
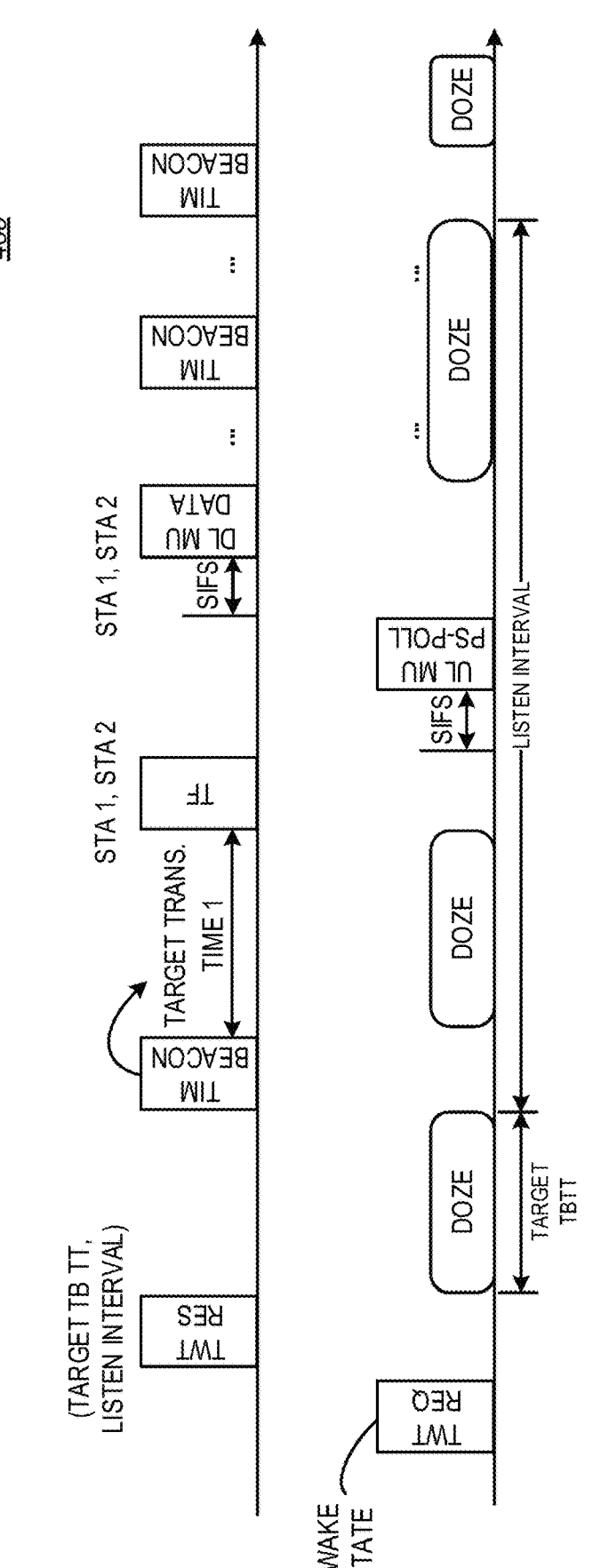
FIG. 4 is a diagram depicting an example Broadcast Trigger TWT.

FIG. 4 is a diagram depicting an example Broadcast Trigger TWT 400. A TWT request and a TWT response may be exchanged between a STA and an AP. The TWT request and the TWT response may negotiate the target Beacon frame monitored by a PS STA. For example, the STA may send a TWT request to the AP to request the broadcast trigger TWT operation. The AP may send a TWT response to the STA. The TWT response may include the TWT set to a target TBTT and/or the TWT wake interval set to a listen interval of the STA. The STA may monitor the Beacon frame with the period of TWT wake interval from the TWT. When the STA receives one or more target trigger times in a TWT response included in the Beacon, the STA may save power until the one or more target trigger times. The STA may wake up at the one or more target trigger times (e.g., to receive the trigger frame).

A format for the trigger frame may include common information. The common information may include a format of the information, a duration and/or an indication of a purpose of the trigger. The format for the trigger frame may include per-user information. The per-user information may include an AID, a RU allocation description, power control information, and/or the like.

FIG. 5 is a diagram depicting an example trigger frame format 500. A control frame format may include information to identify one or more STAs transmitting the UL MU PPDUs and/or allocating resources for the UL MU PPDUs. For example, a trigger frame 500 may include a legacy header, one or more addresses, one or more trigger information fields, and/or a FCS field. The legacy header may include a FC field and/or a duration field. A receiver may determine a NAV setting based on the legacy header. The one or more addresses may be determined based on usage and/or format of the one or more trigger information fields. The one or more trigger information fields may include information for one or more receivers. The one or more trigger information fields may include information common for the one or more receivers and/or information specific to each of the one or more receivers. The one or more trigger information fields may include one or more subfields that indicate the format of the information. The one or more trigger information fields may include a duration of the UL MU response. The one or more trigger information fields may include an indication of the purpose of the trigger. The one or more trigger information fields may include an identifier of the STA (e.g., an AID). The one or more trigger information fields may include an UL MU MIMO resource allocation description (e.g., one or more allocated streams). The one or more trigger information fields may include an UL OFDMA resource allocation description (e.g., one or more allocated RUs). The one or more trigger information fields may include power control information.

Figure 6:
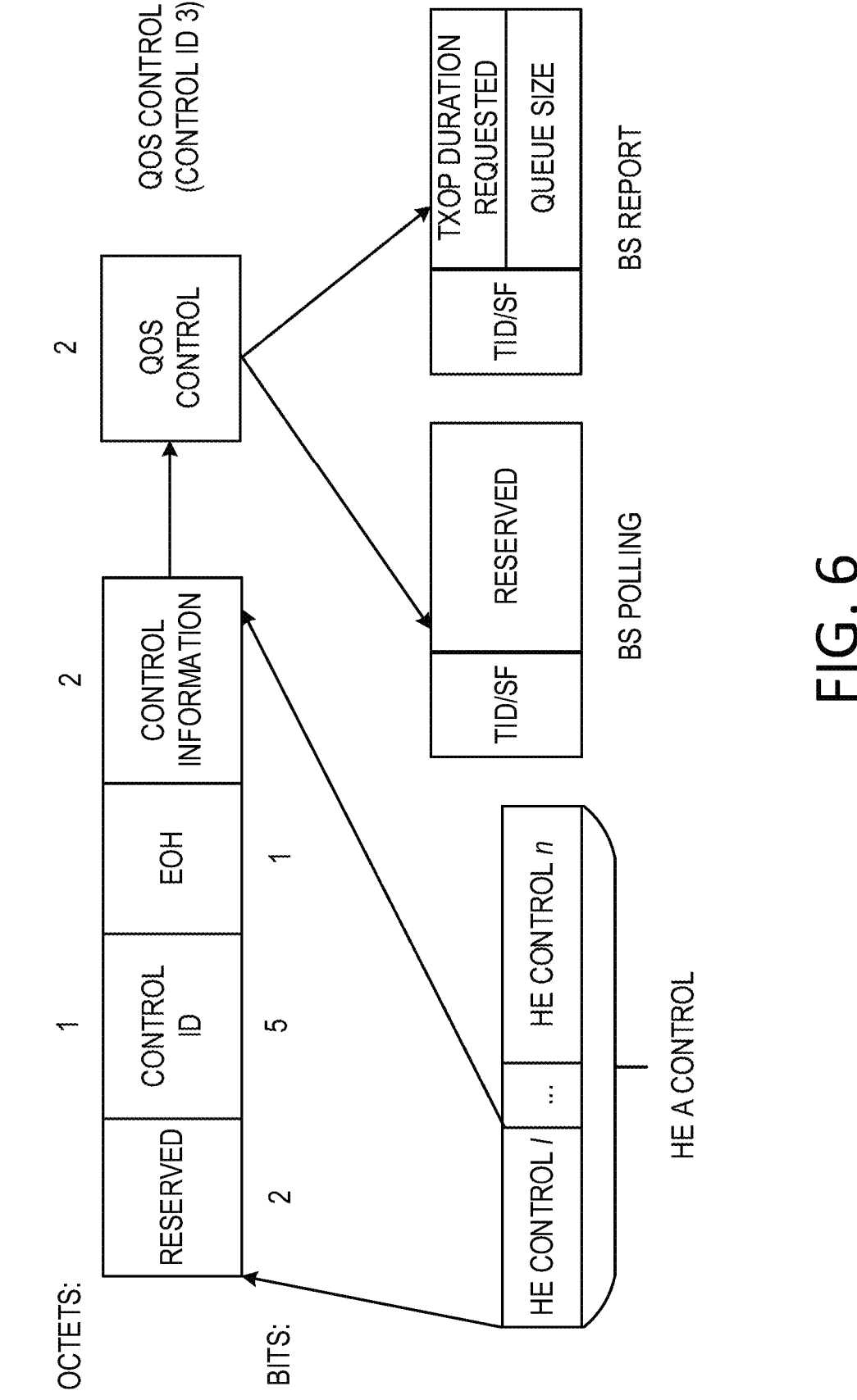
FIG. 6 is a diagram depicting an example HE A-Control field with buffer status poll/report information.

FIG. 6 is a diagram depicting an example HE A-Control field 600 with buffer status poll/report information. An Aggregated control field (e.g., HE A-Control field 600) may include control information (e.g., such as control information needed for different 802.11ax features). The HE A-Control field 600 may be flexible. The HE A-Control field 600 may be dynamically added to a PPDU (e.g., with minimal overhead). The HE A-Control field 600 may include buffer status poll/report information. The HE A-Control field 600 may include a QoS control field.

Coordinated orthogonal channel access (COCA) in WLAN may be provided. COCA in WLAN may include capability indication for support COCA, configuration for COCA operation, synchronization of COCA operations, identification of multiple COCA frames, and/or carrying information on COCA frame.

Figure 7:
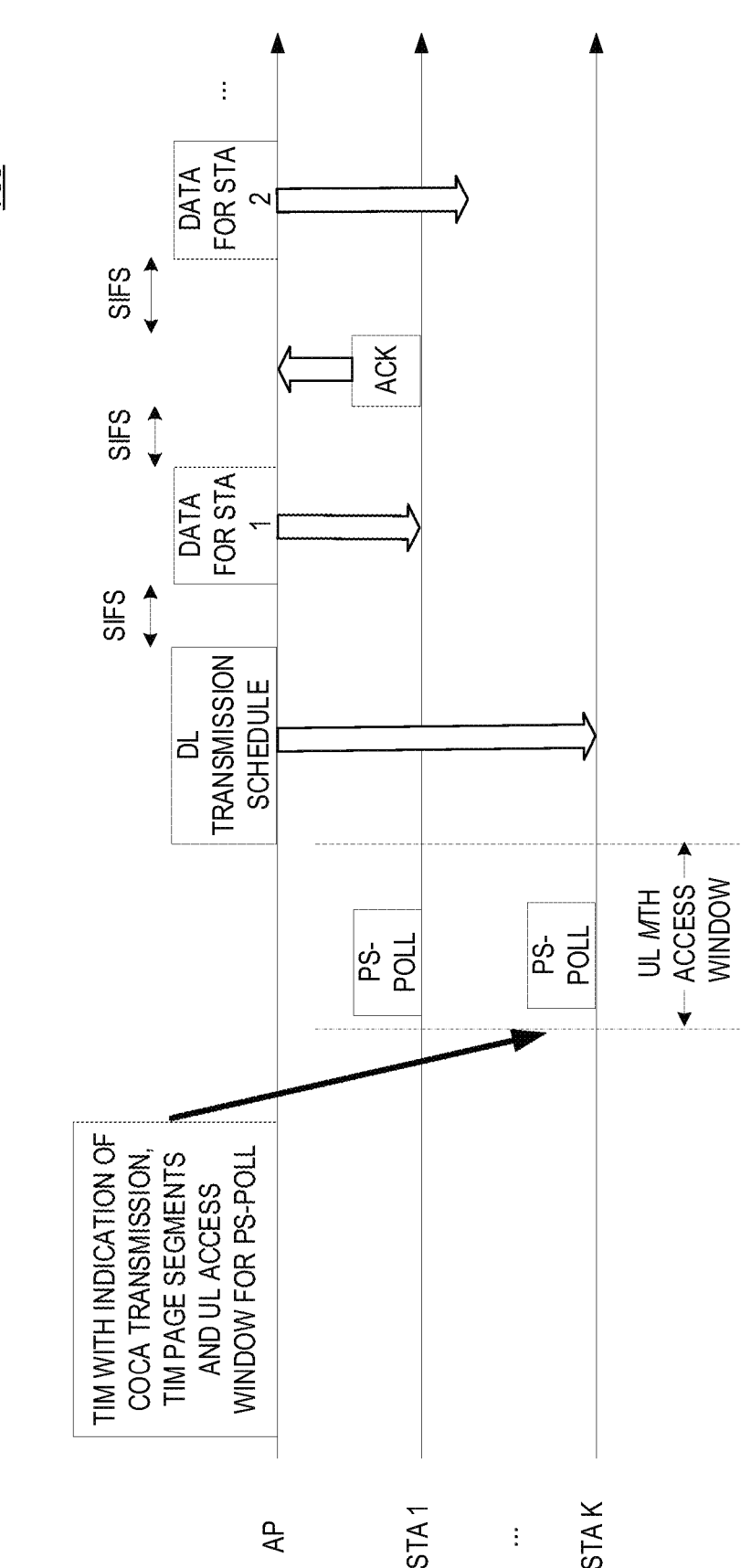
FIG. 7 is a diagram depicting example PS-Poll transmissions with random access.
Figure 8:
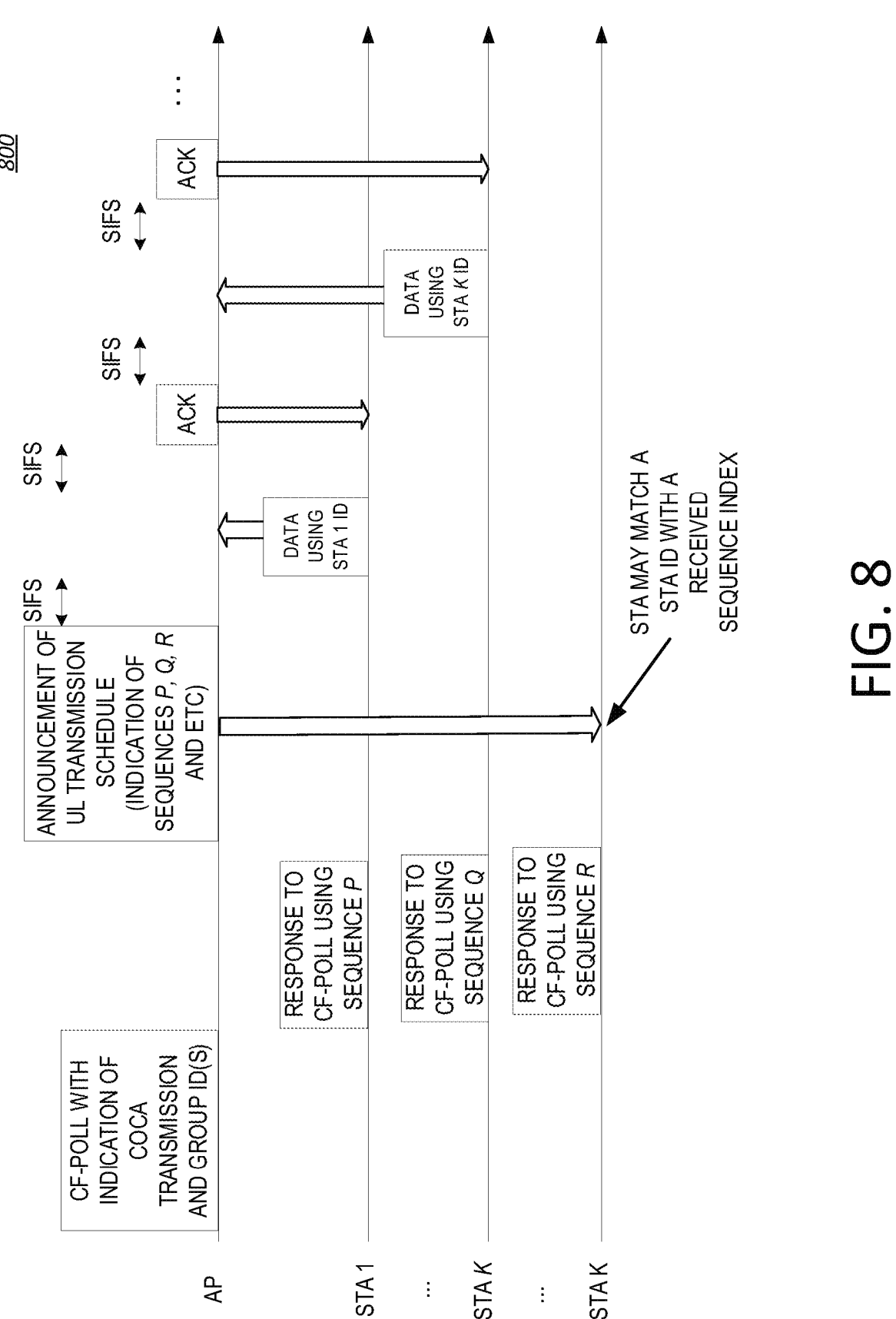
FIG. 8 is a diagram depicting an example CF-Poll transmission with random access.

A PS-Poll frame and/or a CF-Poll frame may be transmitted in a random access way. The PS-Poll frame and/or the CF-Poll frame may be triggered by a Trigger Frame. FIG. 7 is a diagram depicting example PS-Poll transmissions with random access 700. FIG. 8 is a diagram depicting an example CF-Poll transmission with random access 800.

A network discovery and link setup using random access may be provided. Network discovery and link setup may include discovery of available AP, service discovery, authentication, association, and/or IP address allocation for WLAN systems. A STA may need to establish a connection (e.g., within a time period, for example quickly and/or efficiently) to prevent delays in an application and/or to prevent an excessive load from clogging up the wireless medium. A STA may be unknown to an AP prior to link setup. A load of traffic between the STA and the AP may be difficult to predict (e.g., unpredictable). In network discovery and link setup, one or more unassociated STAs are likely unknown to the AP. A traffic load associated with the network discovery and link setup of the one or more unassociated STAs may be difficult to predict (e.g., unpredictable). The one or more unassociated STAs may use random access to conduct network discovery. The one or more unassociated STAs may use random access to conduct link setup with one or more APs.

An AP may send resource allocation information and/or a trigger in one or more types of frames. The resource allocation information and/or trigger may be used for a transmission of one or more frames. For example, an AP may include, in a beacon (e.g., a regular beacon or a short beacon), FILS discovery frames, measurement pilots frames, broadcast Probe Response frame, Authentication Response frame, or other type of frames, one or more resource allocations and/or triggers associated with the transmission of network discovery and link setup frames, such as probe request, service discovery, authentication request, association request, and/or re-association request.

Figure 9:
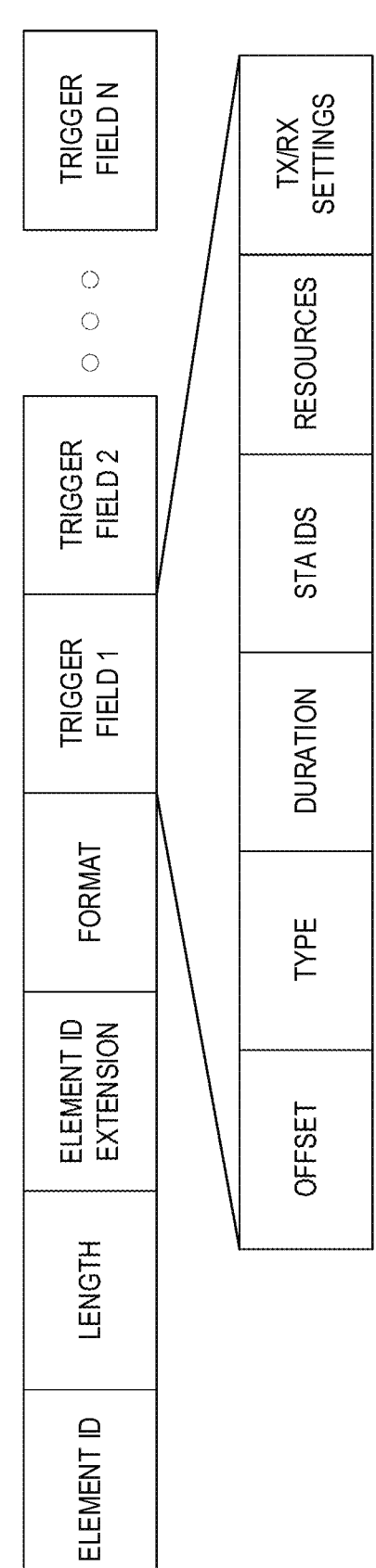
FIG. 9 is a diagram depicting an example trigger element.

FIG. 9 is a diagram depicting an example trigger element 900. A device (e.g., an AP, a STA acting as an AP, a non-AP STA, etc.) may include a trigger element 900 in a beacon, a short beacon, a FILS Discovery frame, a broadcast Probe Response frame, an Authentication Response frame and/or any other type of frame. For example, the Trigger element 900 may include one or more of the following fields: Element ID, Length, Element ID Extension, Format, and/or one or more trigger fields.

The Element ID and/or the Element ID Extension fields may indicate (e.g., individually or combined to indicate) that an element is a Trigger element. The Length field may indicate a length of the remaining element in the Trigger element 900. The Format field may indicate a format of the Trigger fields. The format of the trigger fields may include one or more of the following: Deterministic Access, Random Access, Mixed Deterministic Access, and/or Random Access. In Deterministic Access, one or more STAs that are allowed to access the medium may be indicated (e.g., implicitly or explicitly). In Deterministic Access, one or more allocated resources for a STA in the associated triggered TXOP may be indicated (e.g., implicitly or explicitly). In Random Access, one or more STAs that are allowed to access the medium may be indicated. A resources pool for random access may be indicated. A resource used for medium access and/or which STA to conduct random access may not be deterministic. In Mixed mode, deterministic and random access may be allowed (e.g., used). One or more resources used for random access may be indicated. A Format field may be included (e.g., in each Trigger Field) to indicate the format of the Trigger Field (e.g., each Trigger Field).

The one or more trigger fields may be represented as Trigger Field 1-N. Each Trigger Field may indicate triggering information for a period. Each Trigger Field may comprise one or more of the following fields: an offset field, a type field, a duration field, a STA IDs field, a resources field, and/or a TX/RX settings field.

The offset field may indicate an offset timing of the triggered transmissions. The offset timing may start at the end of a current frame. The offset timing may start at a TSF timer value or a point of time. An Offset field value of 0 may indicate that the triggered transmission may start following (e.g., immediately following) the current frame (e.g., with potentially some pre-determined delay, such as IFS, DIFS, AIFS, etc.). The offset field may be signaled (e.g., implicitly signaled) through a list of parameters included.

The Type field may indicate a type of frames that may be triggered. Possible values of the Type field may include PS-Poll, Data, Control, Management, network discovery (e.g., Probe Request), link setup (e.g., authentication request and/or (Re) Association Request) frames, and/or one or more (e.g., all) Types of frames. The type field may include a bitmap where a "1" indicates that a type of frames are allowed to be transmitted.

The duration field may include one or more durations of the triggered transmissions. The duration field may include one or more parameters that may be used to determine the one or more durations of the triggered transmissions. The duration field may be signaled (e.g., implicitly signaled) by including a list of parameters.

The STA IDs field may include one or more subfields. The one or more subfields of the STA IDs field may include identifications of one or more STAs that are triggered to conducted medium access. Each of the one or more subfields may include one or more of MAC addresses, AIDs, broadcast cast addresses (e.g., which may imply that all STAs are allowed to conduct random access), and/or Group ID/addresses (e.g., which may imply a group of STAs that are allowed to conduct deterministic or random access; in case of deterministic access, the order of the STAs in the group may imply the order of resource allocated).

The Resources field may include one or more subfields. The one or more subfields of the Resources field may indicate one or more resources that are allocated for triggered transmissions. In the case of random access, the Resources field may include a bitmap indicating which RBs are allowed to be used as resources. In the case of Mixed or Deterministic Access, each of the one or more subfields may correspond to a subfield in the STA IDs field. In the case of Group ID/Address in the STA IDs field, an order of a STA in a Group may imply the order of the subfield comprising the resource allocated to that STA.

The TX/RX Settings field may indicate the TX/RX settings for the triggered transmissions (e.g., such as transmit power). The TX/RX Settings field may indicate a modulation/coding scheme (MCS). A transmit power setting may be implemented as "Transmit Power of current frame" or "Target Receive Power of the Triggered Transmissions at AP". One or more triggered STAs may use the transmit power setting value to determine an appropriate transmit power for the triggered transmissions.

Figure 10:
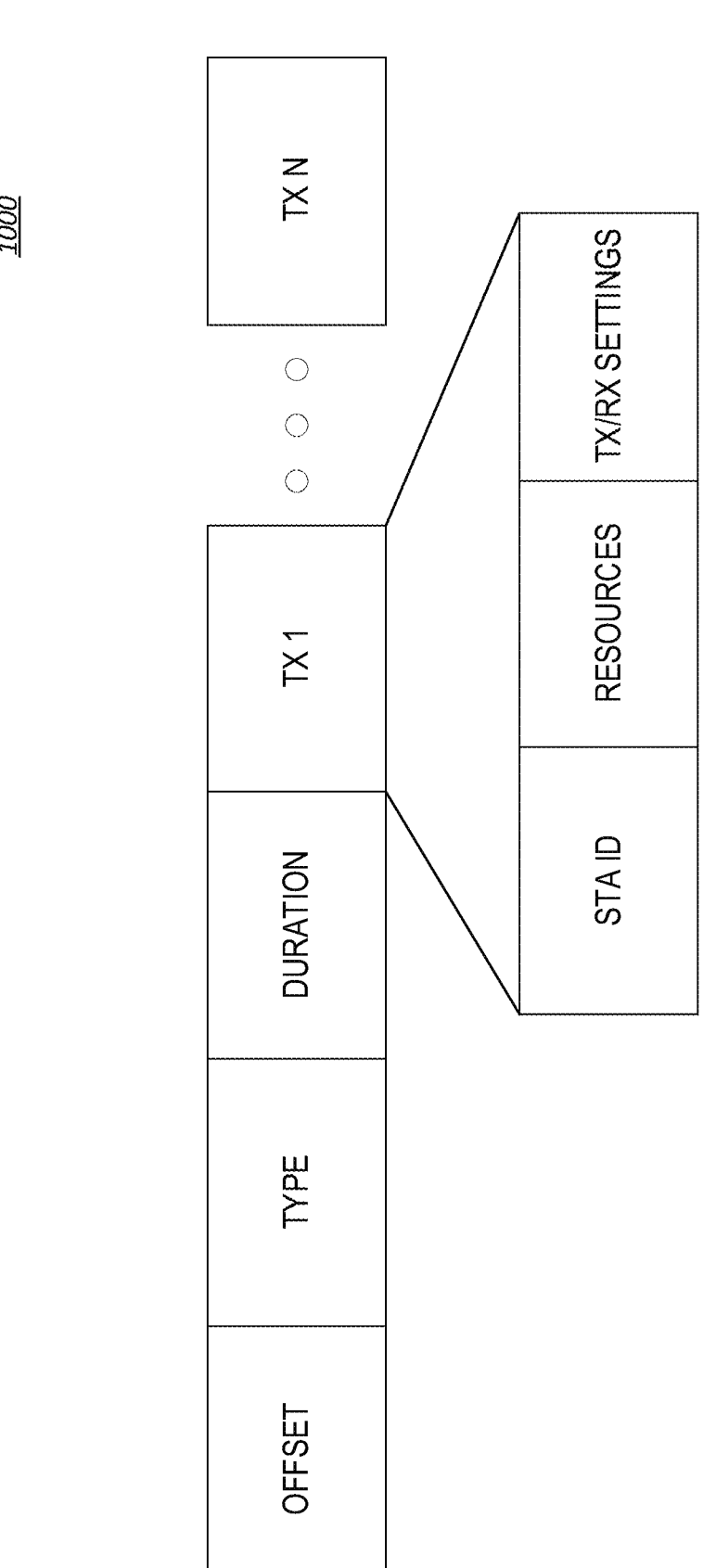
FIG. 10 is a diagram depicting an example trigger field design.

FIG. 10 is a diagram depicting an example Trigger Field 1000 design. Each TX field may include a STA ID field, a Resources field, and/or a TX/RX Settings field. The Resources field may indicate one or more resources allocated to the one or more STAs indicated in the STA ID field. The TX/RX Settings field may be associated with the one or more STAs indicated in the STA ID field. In the case of random access (e.g., Mixed or Random Access Format), the STA ID field may include an indicator that the resources allocated is meant for random access. The indicator may include a broadcast address, a multi-cast address, and/or a specific value. In the case of deterministic access (e.g., Mixed or Deterministic Access Format), the STA ID field may include a MAC Address, an AID, and/or other type of STA IDs that may use the allocated resources to conduct deterministic access.

Figure 11:
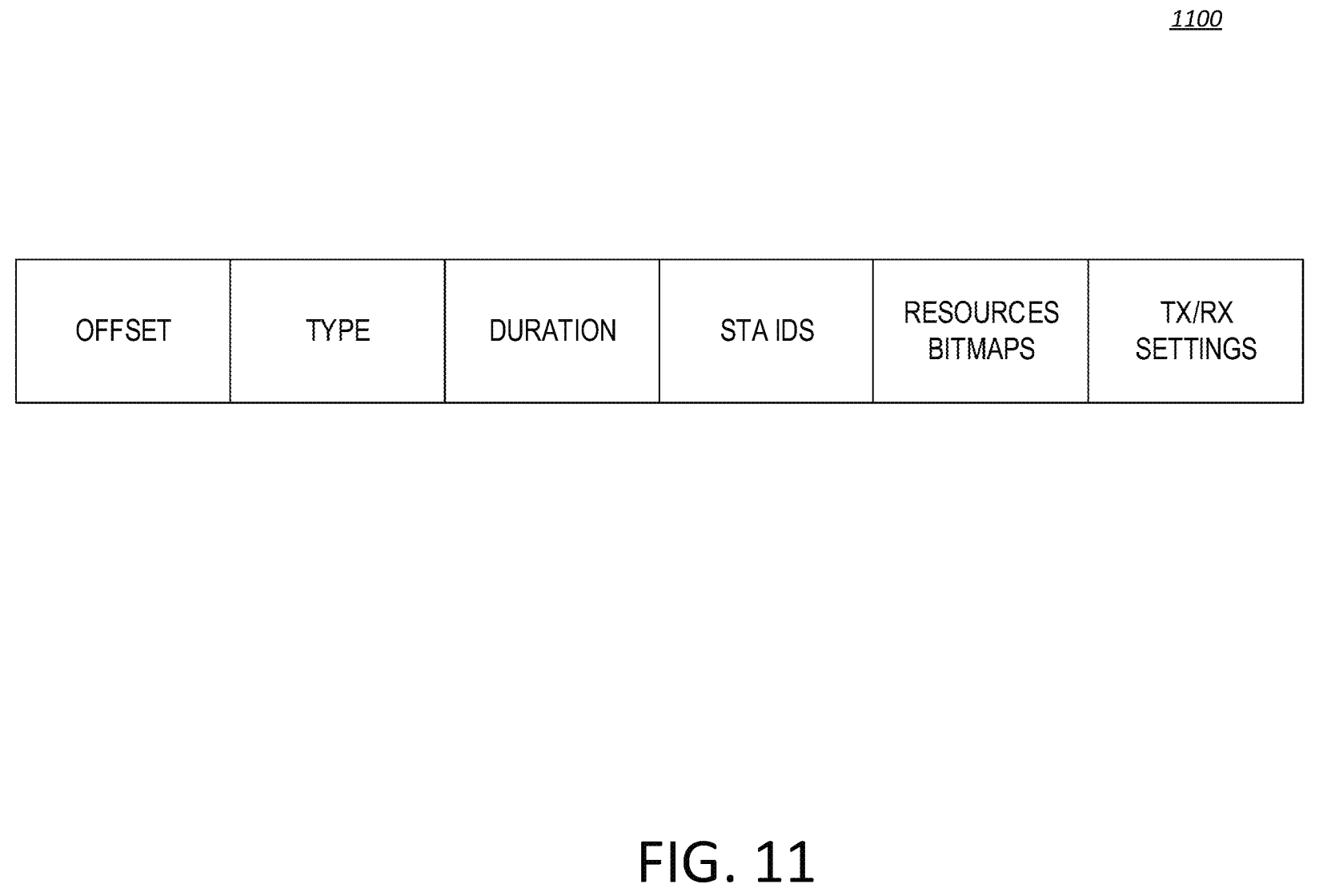

FIG. 11 is a diagram depicting an example Trigger Field 1100 design (e.g., for Random Access). The example Trigger Field 1100 design may include an Offset field, a Type field, a Duration field, a STA IDs field, a Resources Bitmaps field, and/or a TX/RX Settings field. The STA IDs field may indicate one or more STAs. The STA IDs field may include one or more values such as a broadcast address, multicast address, group address/ID, or a specific value. The one or more STAs indicated in the STA IDs field may conduct medium access. The Resources Bitmap field may include a Bitmap that indicates one or more resources that may be used for random access.

A Trigger element (e.g., a subset of fields and/or a subfield thereof) may be implemented using a newly defined element, or an existing element (e.g., such as an RPS element, a TWT element, a TIM element, and/or a Power Saving element). The Trigger element may be implemented as part of any existing or new frames, such as trigger frames, beacon frames, short beacon frames, FILS Discovery frames, NDP frames and/or any other type of frames. The trigger element may be implemented as MAC/PHY headers.

Figure 12:
FIG. 12 is a diagram depicting an example Network Discovery and Link Setup.
Figure 12:
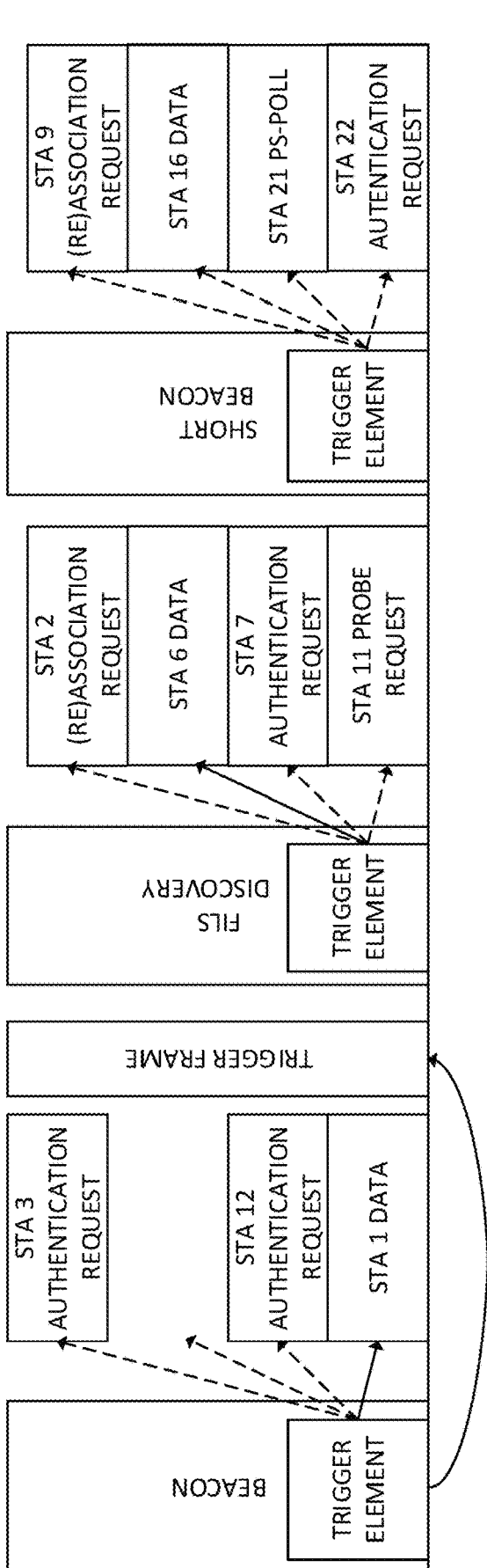

FIG. 12 is a diagram depicting an example associated with Network Discovery and Link Setup 1200. Dashed arrows may indicate triggered random access. Solid arrows may indicate triggered deterministic access.

The Network Discovery and Link Setup 1200 may include one or more of the following. An AP may broadcast a beacon frame or a probe response frame. The beacon frame or probe response frame may include a Trigger element. The probe response frame may be a broadcast probe response frame. The trigger element may trigger one or more Triggered transmissions. The Trigger Element may trigger random access and/or deterministic access. The Trigger Element may indicate that one or more resources meant for random access may be used for the purpose of network discovery, link setup, and/or data, PS-Poll frames or one or more other frames (e.g., all type of frames). The Trigger Element may trigger random access and/or deterministic access after (e.g., immediately following) the beacon frame. The trigger element may trigger random access and/or deterministic access with a delay such as DIFS, AIFS, SIFS, or a pre-determined value. The delay may be determined based on a value indicated in the beacon (e.g., in the Trigger element). A Trigger Frame may be sent after (e.g., immediately after) the Beacon frame or probe response frame. The trigger frame may include similar contents as the Trigger Element.

As shown in FIG. 12, a Trigger Element in the beacon may allocate one or more (e.g., three) resources such as RBs for random access for Network Discovery and Link Setup frames. A Trigger Element in a probe response frame (e.g., a broadcast probe response frame) may allocate one or more resources for random access for Network Discovery and Link setup frames. A group of STAs (e.g., or all STAs) may be allowed to use one or more random access resources as indicated in the Beacon frame or the broadcast probe response frame (e.g., in the Trigger Element). One resource may be used for deterministic access for one or more frames (e.g., all type of frames). STA 3 and STA 12 may select (e.g., randomly) resources or RBs 1 and 3 for random access to transmit corresponding Authentication Request frames. Resource 2 may not be selected by a STA for random access. STA 1 may use deterministic access to transmit a data frame to the AP.

In a case where more than one Triggered session (e.g., indicated by a second or later Trigger Field) are triggered by a beacon frame or a broadcast probe response frame, a Trigger Frame may be sent at the beginning of the second or other subsequent triggered sessions. The Trigger Frame may include the same information as the corresponding Trigger Field. A STA that is not able to successfully conduct random access or deterministic access may conduct random or deterministic access in a later triggered session. A STA that experienced a collision or a failure (e.g., transmitted packets are not acknowledged) in an earlier triggered session may conduct random or deterministic access in a later triggered session. The Trigger Frame may include an indication of whether a Trigger Frame/Triggered session will follow the current Trigger frame. The Trigger Frame may include an indication of whether the current Triggered Session will be the last in a series of the triggered transmissions. The indication of whether the current Triggered Session will be the last in a series of the triggered transmissions may indicate that one or more STAs are allowed to compete for medium access after the last triggered transmissions. One or more STAs that are indicated to be triggered in a later Triggered Session may enter power saving mode. The one or more STAs may wake up at a later assigned Triggered Session.

An AP may broadcast or multicast a FILS Discovery frame. The FILS Discovery frame may include a Trigger element. The Trigger element may trigger one or more Triggered transmissions. The Trigger Element may trigger both random access and/or deterministic access. The Trigger Element may indicate that one or more resources meant for random access may be used for network discovery, link setup, and/or data, PS-Poll frames or one or more frames (e.g., all type of frames). The Trigger Element may trigger random access and/or deterministic access after (e.g., immediately following) the FILS Discovery frame. The Trigger Element may trigger random access and/or deterministic access with a delay such as DIFS, AIFS, SIFS, or a pre-determined value. The delay may be determined based on a value indicated in the FILS Discovery frame (e.g., in the Trigger element). A Trigger Frame may be sent after (e.g., immediately after) the FILS Discovery frame which may include similar contents as the Trigger Element.

As shown in FIG. 12, the Trigger Element in the FILS Discovery frame may allocate one or more (e.g., three) resources such as RBs for random access for Network Discovery and Link Setup frames. A group of STAs (e.g., all STAs) may be allowed to use the random access resources as indicated in the FILS Discovery frame. The Trigger Element in the FILS Discovery frame may allocate a resource for deterministic access for data frames. For example, STA 2, STA 7 and STA 11 may select (e.g., randomly select) resource 1, 3 and 4 for random access to transmit an Association Request or a Re-Association Request frame, an Authentication Request frame and/or a Probe Request frame. STA 6 may use deterministic access to transmit a data frame to the AP.

In a case where more than one Triggered session (e.g., indicated by the second or later Trigger Field) are triggered by the FILS Discovery frame, a Trigger Frame may be sent at the start of a second or later triggered session. The Trigger Frame may include the same information as the corresponding Trigger Field. A STA that is not able to conduct random access or deterministic access may conduct random or deterministic access in a later triggered session. A STA that experienced a collision (e.g., transmitted packets are not acknowledged) in an earlier triggered session may conduct random or deterministic access in a later triggered session. The Trigger Frame may include an indication of whether a Trigger Frame/Triggered session will follow the current Trigger frame. The Trigger Frame may include an indication that the current Triggered Session will be the last in a series. A STA that is indicated to be triggered in a later Triggered Session may enter a power saving mode. The STA may wake up at a later assigned Triggered Session.

An AP may broadcast a Short Beacon frame including a Trigger element. The Trigger element may trigger one or more Triggered transmissions. The Trigger Element may trigger both random access and/or deterministic access. The Trigger Element may indicate one or more resources meant for random access may be used for the purpose of network discovery, link setup, and/or data, PS-Poll frames or one or more frames (e.g., all type of frames). The Trigger Element may trigger random access and/or deterministic access after (e.g., immediately following) the Short Beacon frame. The Trigger Element may trigger random access and/or deterministic access after a delay such as DIFS, AIFS, SIFS, or a pre-determined value. The delay may be indicated in the Short Beacon frame (e.g., in the Trigger element). A Trigger Frame may be sent after (e.g., immediately after) the short Beacon frame which may include similar contents as the Trigger Element.

As shown in FIG. 12, the Trigger Element in the Short Beacon frame may allocate one or more (e.g., two) resources. The one or more resources may include resources 1 and 4 (e.g., such as RBs for random access for Network Discovery and Link Setup frames). A group of STAs (e.g., all STAs) may be allowed to use the random access resources as indicated in the Short Beacon. Resource 2 may be used for random access for one or more frames (e.g., all types of frames). Resource 3 may be used for random access for PS-Poll. STA 9 and STA 22 may select (e.g., randomly select) resource 1 and 4 for random access to transmit an Association or Re-Association Request frame and an Authentication Request frame. STA 6 may use deterministic access to transmit a data frame to the AP. STA 16 may select (e.g., randomly select) resource 2 to transmit a data frame. STA 21 may select (e.g., randomly select) resource 3 to transmit a PS-Poll frame.

In a case where more than one Triggered session (e.g., indicated by a second or later Trigger Field) are triggered by the beacon frame (e.g., the short beacon frame), a Trigger Frame may be sent at the start of the second or later triggered session. The Trigger Frame may include the same information as the corresponding Trigger Field. A STA that is not able to conduct random access or deterministic access may conduct random or deterministic access in a later triggered session. A STA that experienced a collision (e.g., transmitted packets are not acknowledged) in an earlier triggered session. The Trigger Frame may include an indication of whether a Trigger Frame/Triggered session will follow the current Trigger frame. The Trigger Frame may include an indication that the current Triggered Session will be the last in a series of triggered sessions. A STA that is indicated to be triggered in a later Triggered Session may enter a power saving mode. The STA may wake up at a later assigned Triggered Session.

In a case where a triggered session is for Random Access (e.g., only for Random Access), a response frame for a packet that is transmitted using random access (e.g., such as an ACK/BA, a multi-STA ACK/BA, a probe response frame, an authentication response frame, a (Re) association response frame, and/or a Pre-Association ID assignment frame) may be transmitted after (e.g., immediately following) the random access packet. The response frame for the packet may be transmitted using the same resources on which the random access packets were transmitted.

If an AP has received multiple Probe Request frames, the AP may determine to respond (e.g., the AP may respond) with a broadcast Probe Response frame. The broadcast Probe Response frame may be transmitted over the entire bandwidth, on one or more resources allocated for broadcast/multicast, and/or on one or more resources on which the Probe Request frames are received.

An AP may receive a random access packet (e.g., network discovery and/or link setup frames from STAs transmitted using random access). The AP may send a response at a later point of time. The response may be sent using a resource that is allocated for broadcast/multicast frames. The resource allocated for broadcast/multicast resources may be indicated by a specific sequence and/or one or more fields included in the PHY or MAC header of a frame (e.g., an MU frame). An example of a broadcast/multicast resource may include a Random Access Response. The Random Access Response may be indicated by a specific sequence and/or one or more fields included in the PHY and/or MAC header of a MU frame. After transmitting random access packets, a STA may monitor one or more resources allocated for broadcast/multicast (e.g., for Random Access Response) for a response frame. The response frame may be indicated by a specific sequence or one or more fields in the PHY/MAC header of an MU frame.

In a case where a trigger session is for Mixed Random and Deterministic Access, a STA (e.g., the AP) may allocate one or more resources for random access (e.g., consecutively) and/or allocate one or more resources for deterministic access (e.g., consecutively). A response frame for packets sent using random access may be sent (e.g., immediately after some IFS) following the random access transmission. The response frame may be sent on the same resources on which the random access packet was sent. A multi-STA BA/ACK may be sent as a response frame for one or more (e.g., all) frames sent using random access on the resources allocated for random access in one or more previous transmissions. The response frames for the packets sent using deterministic access may be sent over the same resource allocated for deterministic access. For example, a multi-STA ACK/BA may be transmitted as a response frame for the packets transmitted using deterministic access in one or more previous transmissions.

Network discovery and link setup associated with MU transmissions may be provided. Network discovery and link setup may utilize more than one frame exchange between an AP and an unassociated STA. Among the last several frame exchanges, the unassociated STA may be assigned an association ID (AID). Before being assigned the AID, the unassociated STA may not have an identity which may be used by the AP within this basic service set (BSS). With single user transmission, the AP may use the MAC address of the unassociated STA after the first frame exchange. It may be inefficient to identify an unassociated STA by MAC address (e.g., because the MAC address is 48 bit long). With multi-user transmissions, identifying an unassociated STA by MAC address may be more inefficient. For example, an AP may need to use the limited signaling bits in a PLCP header to signal resource allocation to the unassociated STA.

A Pre-Association ID (PID) may be provided. An AP may use the PID to identify an unassociated STA, which may be more efficient. The AP may use the PID to identify the unassociated STA in one or more frame exchanges, for example, before the unassociated STA associates with the AP.

A PID may be assigned by the AP (e.g., explicitly through signalling from the AP to the STAs). The PID may be calculated by the AP and/or an unassociated STA (e.g., separately) based on a predefined rule and/or formula. The PID may be determined, for example, after the first frame exchange between the AP and the unassociated STA.

The PID, together with a BSSID or the MAC address of the AP, may be used (e.g., uniquely or almost uniquely) to identify an unassociated STA within a time period (e.g., before the unassociated STA associates with the AP). The PID may be used, for example, by the AP, to identify the unassociated STA before an AID is allocated to the unassociated STA. For example, the PID may be valid before a normal and/or permanent AID is assigned to the unassociated STA. In a case where the unassociated STA fails to associate with the AP, the AP may signal to the unassociated STA that the PID is no longer available, assign the PID to other unassociated STAs, and/or define a lifetime of the PID explicitly. The AP may signal a pre-defined PID lifetime to the unassociated STAs. The pre-defined PID lifetime may define a period of time for which a corresponding PID is valid.

An AP and an unassociated STA may calculate the PID separately by following a predefined rule/formula. The AP and the unassociated STA may calculate the PID using information that is known to both the AP and the unassociated STA, for example, without extra signalling. For example, the AP may know the MAC address of the unassociated STA and the unassociated STA may know the MAC address of the AP. The PID may be a function of the BSSID (e.g., the AP's MAC address) and the unassociated STA's MAC address. The PID may be represented as, PID=function (BSSID, unassociated STA MAC address)

The PID may include fewer bits than a BSSID and/or a STA MAC address. The PID may not be universally unique.

A time related parameter (e.g., such as a timestamp, TSF timer, or compressed version of TSF timer in Trigger) of the first frame exchange may be considered in a case where the PID is calculated. A Trigger Frame which triggers the first frame exchange and/or other DL frames may include the time related parameter. The PID may be represented as, PID=function (BSSID, unassociated STA MAC address, Time related parameter)

The function may include a hash function that is pre-defined and/or known to both the AP and the unassociated STA.

An AP and an unassociated STA may calculate a PID separately (e.g., independently) by following a predefined rule and/or formula. The AP and the unassociated STA may calculate the PID using information that is known to both the AP and the unassociated STA. The calculation may be associated with a Trigger based association. A first UL transmission from an unassociated STA may be initiated by a Trigger Frame. The first UL transmission from the unassociated STA may be initiated by a Trigger Element in another type of frame, e.g., such as a beacon frame. A Trigger Token field may be included in the Trigger Frame or the Trigger Element.

The Trigger Token field may include an integer number which may be used to identify (e.g., uniquely identify) a Trigger Frame or a Trigger Element within a given time period.

The Trigger Token field may include K bits in the range of $[0,2^k-1]$. The AP may increase the trigger token number by 1 for each Trigger Frame/Element transmission.

In a case where a maximum Trigger Token number is reached, the AP may restart the trigger token (e.g., counting from 0).

In a case where an unassociated STA successfully sends an UL frame to an AP, the AP and/or the unassociated STA may acquire the trigger token number of the Trigger Frame/ Element which triggered the transmission.

The AP and/or the unassociated STA may know a RU index utilized for the transmission. In a case where more than one RU was utilized, the AP and/or the unassociated STA may record a (e.g., only one) RU index. For example, the unassociated STA may utilize RU2 and RU7 for the UL transmission. The unassociated STA and/or the AP may record the RU index as RU2. PID may be represented as, PID=function (Trigger Token, RU index)

An AP may assign a PID to one or more unassociated STAs.

The PID may include a portion of an AID. The PID may be a specific sequence associated with the AID. For example, a first sequence of numbers in the AID may be used to indicate that the ID is a PID only.

The PID may be assigned in a Trigger Frame and/or a Trigger Element. In a case where the Trigger Frame and/or Trigger Element initiate a random access transmission, the AP may indicate that an unassociated STA which successfully transmitted on one or more RUs may use the particular PID.

The PID may be assigned in a DL acknowledgement to an UL transmission. A DL acknowledgement may include one or more of a multi-STA BA and a single ACK/BA. For example, one or more acknowledgements for deterministic transmissions may be in the format of a Multi-STA BA. In a Multi-STA BA, the AIDs may be utilized to indicate the STAs. For a random transmission, a single ACK and/or BA may be sent using OFDMA. For example, the ACK/BA may be transmitted on the RU which is determined according to a predefined mapping to the RU used by the STA for the previous random access. In a case where an individual ACK/BA is sent with OFDMA mode, one or more ACK/BA frames may be modified to include the PID field.

An AP may signal a pre-defined PID lifetime, for example, when PID is assigned. A fixed pre-defined PID lifetime may be determined, for example, as defined in the standards.

Figure 13:
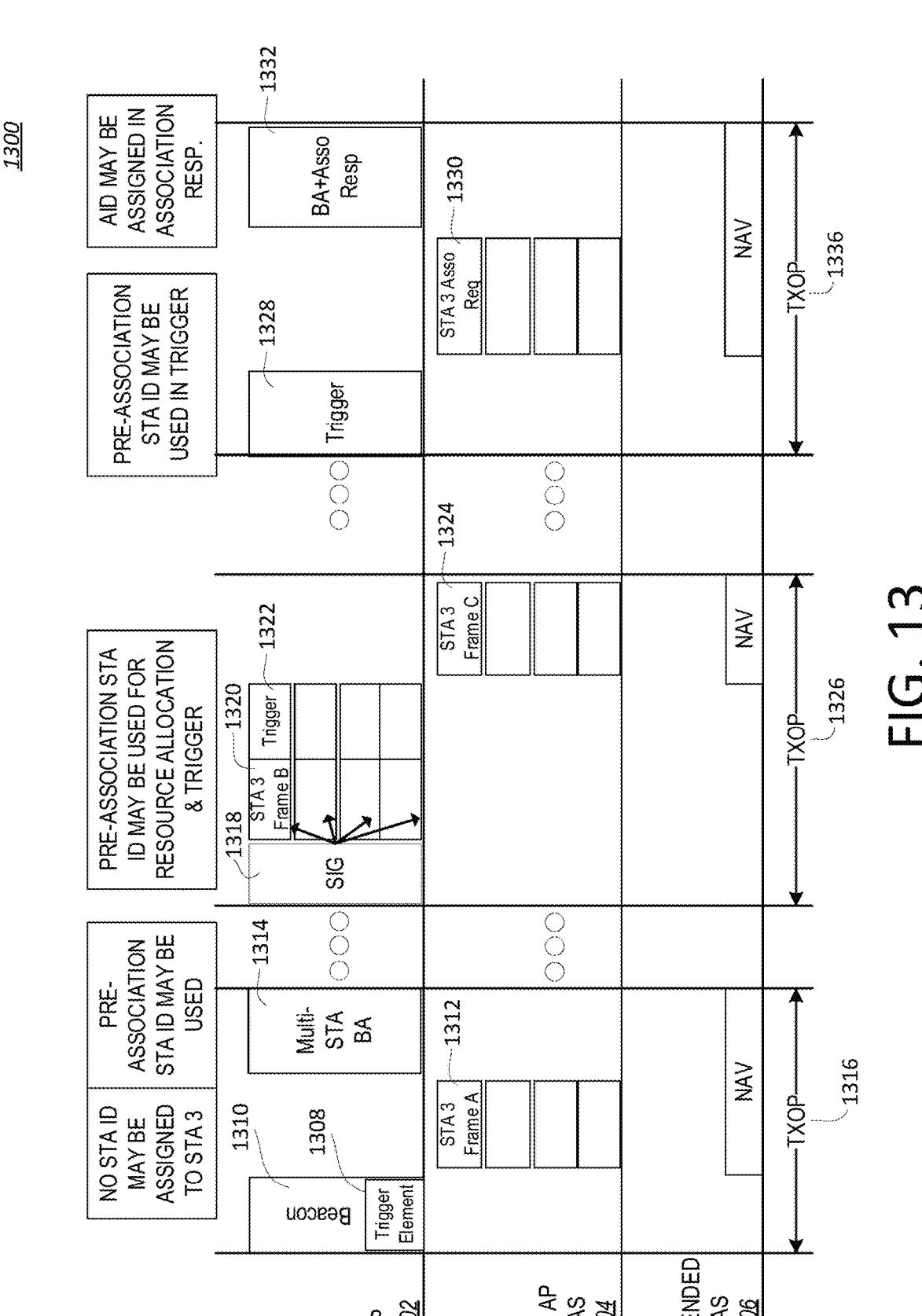
FIG. 13 is a diagram depicting an example Network Discovery and Link Setup implemented using multi-user (MU) transmissions.

FIG. 13 is a diagram depicting an example network discovery and link setup 1300 using MU Transmissions. One or more of the following may apply.

An AP 1302 may transmit a Trigger Frame and/or a Trigger element 1308. The Trigger Frame and/or the Trigger element 1308 may initiate a random access. The AP 1302 may include a PID in the Trigger Frame and/or the Trigger element 1308 (e.g., depending on the PID calculation and/or assignment). The trigger element 1308 may be included in a beacon frame 1310.

One or more non-AP STAs 1304 and/or one or more unintended STAs 1306 may receive the trigger frame and/or trigger element 1308. The one or more non-AP STAs 1304 may include an unassociated STA (e.g., STA 3). The unassociated STA may transmit a first frame (e.g., Frame A 1312) in a RU which was allocated for random access, for example, by the trigger element 1308. The first frame 1312 may be any frame before association. For example, the first frame 1312 may be an Authentication Request frame.

A PID may be calculated at the AP 1302 and/or the unassociated STA(s). The AP 1302 may assign (e.g., indicate to the unassociated STA) the PID using a Trigger Frame and/or a Trigger element 1308. For example, the PID may be included in the trigger element 1308. The AP 1302 may assign the PID using a DL acknowledgement frame.

The AP 1302 may send an acknowledgement (ACK) to a previous UL transmission. For example, the AP 1302 may send the ACK in response to receipt of the first frame 1312 from the unassociated STA. The ACK may be a Multi-STA BA 1314 (e.g., if both the AP 1302 and the unassociated STA know the PID). The multi-STA BA 1314 may indicated the PID for the unassociated STA. The PID may be used instead of an AID (e.g., if no AID is assigned for the unassociated STA).

A second TXOP 1326 may follow (e.g., immediately follow) a first TXOP 1316. The AP 1302 may send a signal frame 1318. The AP 1302 may transmit a second frame 1320 (e.g., Frame B) to the unassociated STA using a MU transmission. The signal frame 1318 and/or the second frame 1320 may be sent in the second TXOP 1326. The second frame 1320 may be any frame before association. For example, the second frame 1320 may be an Authentication Response frame. The AP 1302 may include a resource allocation in a HE-SIG field, including HE SIG-A, HE SIG-B and/or HE SIG-A/SIG-B. The HE SIG field may be carried in the PLCP header of the second frame 1320. The second frame 1320 may include the PID, for example, in a common part and/or a user-specific part of the SIG field (e.g., for resource allocation purpose). A Trigger Frame 1322 may follow the second frame 1320. The Trigger Frame 1322 may trigger an uplink acknowledgement 1324 from the unassociated STA. For example, the unassociated STA may receive the trigger frame 1322. The unassociated STA may send an UL ACK 1324 in response to the trigger frame 1322. The trigger frame 1322 may include the PID to indicate the unassociated STA.

The unassociated STA may send, to the AP 1302, the UL ACK 1324 xIFS time after receipt of the second frame 1320, e.g., in the second TXOP.

A third TXOP 1336 may follow (e.g., immediately follow) the second TXOP 1326. The AP 1302 may transmit a Trigger Frame 1328 to trigger a random access and/or a deterministic access. The trigger frame 1328 may be sent in the third TXOP 1336. In a case where the AP 1302 triggers a deterministic access from the unassociated STA, a PID may be included in the Trigger Frame 1328.

The unassociated STA may send an association request frame 1330 to the AP 1302 in response to the trigger frame 1328. The unassociated STA may send the association request frame 1330 xIFS time after reception of the Trigger Frame 1328. The unassociated STA may send the Association Request frame 1330 to the AP 1302 using one or more RUs.

The AP 1302 may send an association response frame 1332 to the unassociated STA. The association response frame 1332 may include an ACK that includes the PID. The AP 1302 may send the association response frame 1332 xIFS time after reception of the association request frame 1330. The AP 1302 may transmit the Association Response frame 1332 in the third TXOP 1336 or in a next TXOP. The AP 1302 may assign an AID to the unassociated STA. The AID may be utilized to identify the unassociated STA afterwards and the PID may no longer be valid upon assignment of the AID. The Association Response frame may include the AID. The AP 1302 may determine to use the PID as the AID for the unassociated STA.

The first TXOP 1316 may be interpreted as an exemplary frame exchange which may carry UL information (e.g., from an unassociated STA). The second TXOP 1326 may be interpreted as an exemplary frame exchange which may carry DL information (e.g., from the AP 1302).

In Wi-Fi systems, an AP may buffer packets for one or more STAs that are in power saving mode. The AP may announce the buffered packets for the one or more STAs in beacons and/or short beacons. A STA may send a PS-Poll and/or other frames to the AP to indicate that it is awake and ready to retrieve DL packets. Efficient MU DL data retrieval may be provided (e.g., given that OFDMA and UL MU-MIMO are being incorporated into 802.11).

Figure 14:
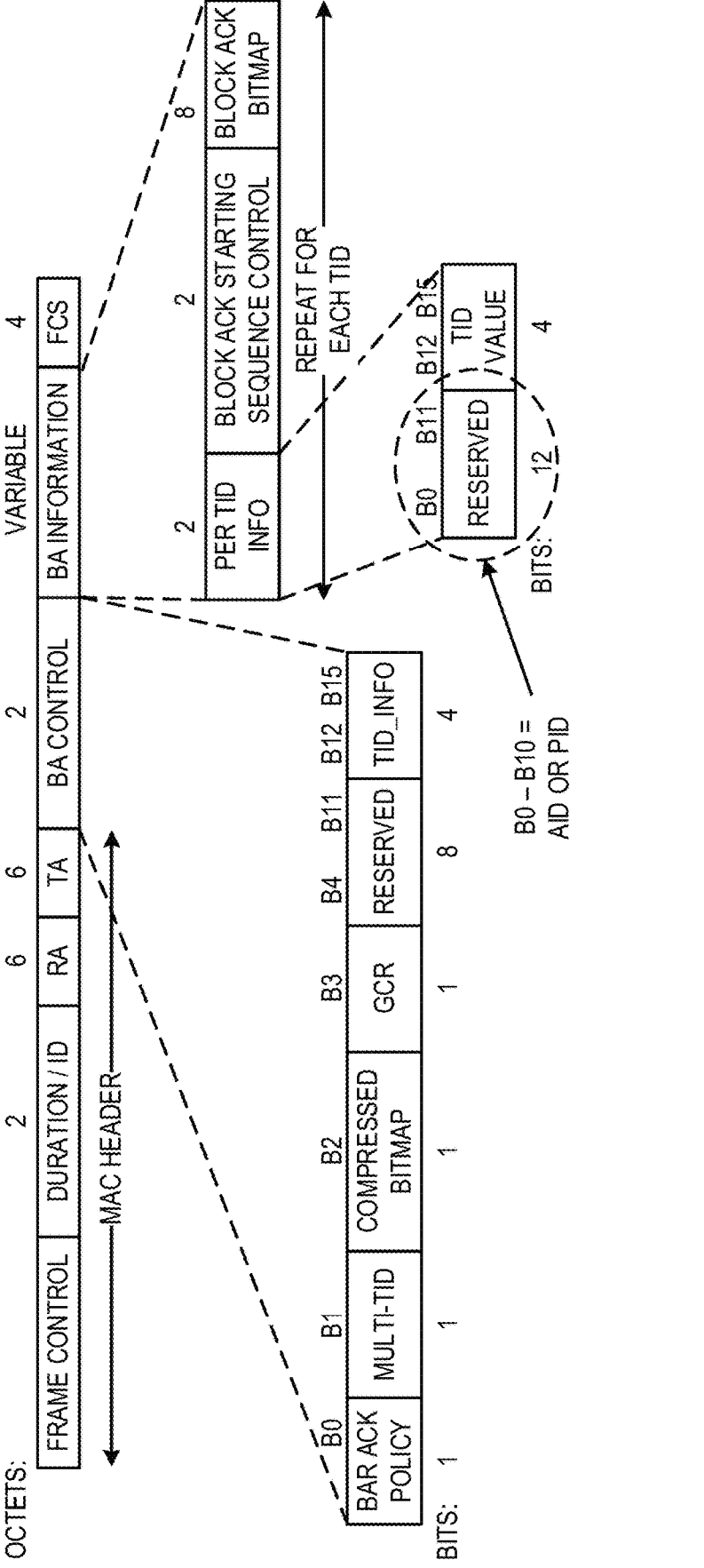
FIG. 14 is a diagram depicting an example frame format for a multi-STA BA with Pre-Association ID (PID).

FIG. 14 is a diagram depicting an exemplary frame format for a Multi-STA BA with PID 1400. The acknowledgement for a STA may be included in an individual ACK/BA. One or more acknowledgements for the rest of the UL transmissions (e.g., other than the STA) may be in the format of a Multi-STA BA and/or an individual ACK/BA.

Figure 15:
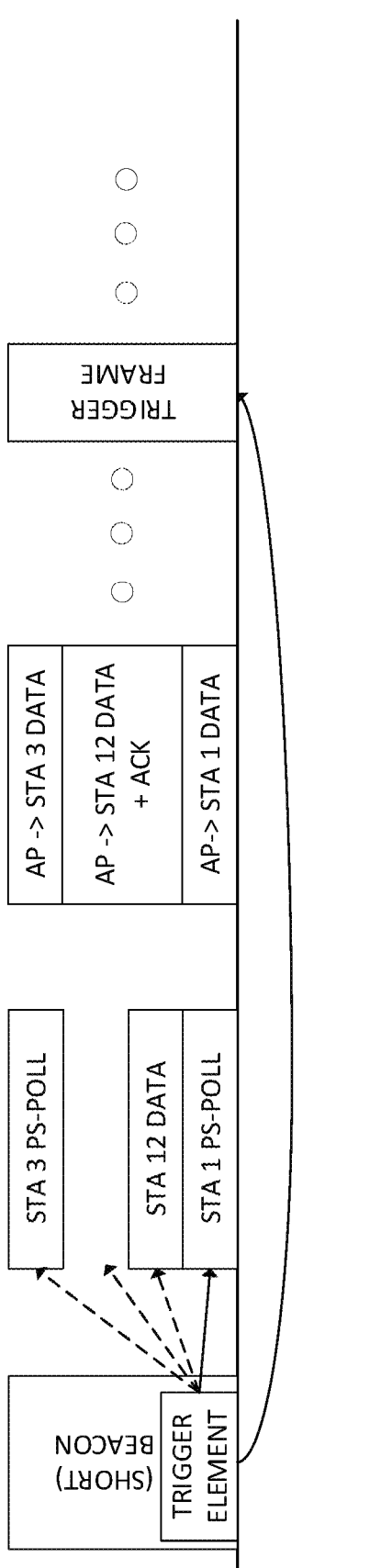
FIG. 15 is a diagram depicting an example triggered PS-Poll and/or DL packet retrieval.

FIG. 15 is a diagram depicting an example procedure for a triggered PS-Poll and/or DL packet retrieval 1500. An AP may broadcast a Beacon frame or a Short Beacon frame including a TIM element and/or a Trigger element. The TIM element may indicate that one or more STAs have one or more buffered packets at the AP. The Trigger Element may trigger one or more triggered transmissions. The TIM element and the Trigger Element may be combined to indicate one or more buffered packets for one or more STAs as well as one or more triggered sessions for the STAs to retrieve the DL packets. The Trigger Element may trigger a random access and/or a deterministic access. The Trigger Element may indicate that one or more resources meant for random access may be used for data, PS-Poll frames, and/or other types of frames. The Trigger Element may trigger random access and/or deterministic access after (e.g., immediately following) the Beacon Frame or Short Beacon frame. The Trigger Element may trigger random access and/or deterministic access after a delay such as a DIFS, an AIFS, a SIFS, or a pre-determined value. The delay may be a value indicated in the Beacon Frame or Short Beacon frame (e.g., in the Trigger element). An exact resource allocated for a STA to conduct DL data retrieval may be determined by a position of an indication (e.g., a positive indication) in a TIM element. The TIM/Trigger Element or the combination thereof may implicitly or explicitly indicate the size of the allocated resources.

A Trigger Frame may be sent after (e.g., immediately after) the Beacon Frame or Short Beacon frame. The Trigger Frame may include similar contents as the Trigger Element.

As shown in FIG. 15, a Trigger Element in a Short Beacon frame may allocate one or more (e.g., two) resources. The one or more resources may include resource 1, 2 and 3. The one or more resources may be RBs for random access for DL Data retrieval, or PS-Poll, and/or Data frame. A group of STAs (e.g., all STAs) may be allowed to use one or more random access resources as indicated in the Beacon Frame or the Short Beacon Frame (e.g., in the Trigger Element). The group of STAs may be allowed to use a resource (e.g., resource 4) for deterministic access for STA 1 to conduct DL data retrieval. A position of resource 4 may be determined based on a position indication in a TIM element for STA 1. STA 3 may select (e.g., randomly select) resource 1 for random access to transmit a PS-Poll to the AP. STA 12 may include an UL data packet. STA 12 may select (e.g., randomly select) resource 3 for random access to send a data packet on resource 3 to the AP. Resource 3 may also serve as a PS-Poll. Resource 2 may not be picked by a STA in random access. STA 1 may use deterministic access to transmit a PS-Poll to the AP.

In a case where more than one Triggered session (e.g., as indicated by a second or a later Trigger Field) are triggered by the short beacon frame, a Trigger Frame and/or another Beacon Frame or Short beacon frame may be sent at the beginning of the second or later triggered session. The Trigger Frame and/or other beacon frame or short beacon frame may include the same or different information as the corresponding Trigger Field. A STA that is not able to conduct random access or deterministic access may conduct random or deterministic access in a later triggered session. A STA that experienced a collision (e.g., transmitted packets are not acknowledged) in an earlier triggered session may conduct random or deterministic access in a later triggered session. The Trigger Frame, beacon frame, or short beacon frame may include an indication of whether more Trigger Frame/Triggered sessions will follow the current Trigger frame. The Trigger Frame, beacon frame, or short beacon frame may include an indication that the current Triggered Session will be the last in a series. One or more STAs that are indicated to be triggered in a later Triggered Session may enter a power saving mode. The one or more STAs may wake up at a later assigned Triggered Session.

Although the features are described herein, each feature or element may be used without other features or in various combinations with or without other features.

Although SIFS is used to indicate various inter frame spacing in the examples, other inter frame spacing such as RIFS, AIFS, DIFS or other agreed time interval could be applied in the same solutions.

Although a certain number of RBs per triggered TXOP may be shown in as an example, the actual number of RBs/channels/bandwidth utilized may vary.

A WTRU may refer to an identity of the physical device, or to the user's identity such as subscription related identities, e.g., MSISDN, SIP URI, etc. WTRU may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A method for use by a station (STA), the method comprising:
   receiving a beacon frame, from an access point (AP) with which the STA is not associated, the beacon frame including a target wake time (TWT) element indicating a broadcast TWT service period (SP) in which the AP will transmit one or more trigger frames to provide resources for uplink orthogonal frequency division multiple access (OFDMA) random access (RA) by unassociated STAs;
   during the broadcast TWT SP, receiving a trigger frame including an indicator that the trigger frame includes one or more resource units (RUs) allocated for uplink OFDMA RA (UORA) by unassociated STAs,
   based on information in the received trigger frame, determining that at least one RU of the one or more RUs is available for use by the STA; and
   sending an uplink frame to the AP using the at least one RU.

2. The method of claim 1, wherein the uplink frame is an association request frame.

3. The method of claim 1, further comprising:
   receiving, from the AP in response to sending the uplink frame, a multi-STA acknowledgment (ACK)/block ACK (BA).

4. The method of claim 1, further comprising:
   prior to receiving the beacon frame, negotiating, with the AP, a target beacon transmission time (TBTT) for the STA to monitor for receiving the beacon frame.

5. The method of claim 1, wherein the at least one RU is usable by the STA for one or more of network discovery or link setup.

6. A station (STA) comprising:
   a transceiver and a processor operatively coupled to the transceiver, the transceiver and the processor configured to:
   receive a beacon frame, from an access point (AP) with which the STA is not associated, the beacon frame including a target wake time (TWT) element indicating a broadcast TWT service period (SP) in which the AP will transmit one or more trigger frames to provide resources for uplink orthogonal frequency division multiple access (OFDMA) random access (RA) by unassociated STAs;
   during the broadcast TWT SP, receive a trigger frame including an indicator that the trigger frame includes one or more resource units (RUs) allocated for uplink OFDMA RA (UORA) by unassociated STAs,
   based on information in the received trigger frame, determine that at least one RU of the one or more RUs is available for use by the STA; and
   send an uplink frame to the AP using the at least one RU.

7. The STA of claim 6, wherein the uplink frame is an association request frame.

8. The STA of claim 6, wherein the transceiver and the processor are further configured to:

receive, from the AP in response to sending the uplink frame, a multi-STA acknowledgment (ACK)/block ACK (BA).

9. The STA of claim 6, wherein the transceiver and the processor are further configured to:

prior to receiving the beacon frame, negotiate, with the AP, a target beacon transmission time (TBTT) for the STA to monitor for receiving the beacon frame.

10. The STA of claim 6, wherein the at least one RU is usable by the STA for one or more of network discovery or link setup.

11. A method for an access point (AP), the method comprising:

sending a beacon frame including a target wake time (TWT) element indicating a broadcast TWT service period (SP) in which the AP will transmit one or more trigger frames to provide resources for uplink orthogonal frequency division multiple access (OFDMA) random access (RA) by unassociated STAs;

during the broadcast TWT SP, sending a trigger frame including an indicator that the trigger frame includes one or more resource units (RUs) allocated for uplink OFDMA RA (UORA) by unassociated STAs, wherein the trigger frame includes information for an unassociated STA to determine that at least one RU of the one or more RUs is available for use by the STA; and receiving an uplink frame from the STA in the at least one RU.

12. The method of claim 11, wherein the uplink frame is an association request frame.

13. The method of claim 11, further comprising:

sending, to the STA in response to receiving the uplink frame, a multi-STA acknowledgment (ACK)/block ACK (BA).

14. The method of claim 11, further comprising:

prior to sending the beacon frame, negotiating, with the STA, a target beacon transmission time (TBTT) for the STA to monitor for receiving the beacon frame.

15. The method of claim 11, wherein the at least one RU is usable by the STA for one or more of network discovery or link setup.

* * * * *